(12) United States Patent
Yamazaki et al.

(10) Patent No.: US 11,266,908 B2
(45) Date of Patent: Mar. 8, 2022

(54) GAME SYSTEM, GAME CONTROL DEVICE, AND INFORMATION STORAGE MEDIUM

(71) Applicant: KONAMI DIGITAL ENTERTAINMENT CO., LTD., Tokyo (JP)

(72) Inventors: Yukihiro Yamazaki, Tokyo (JP); Kazuya Matsumoto, Tokyo (JP); Saori Akune, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 2 days.

(21) Appl. No.: 16/986,215

(22) Filed: Aug. 5, 2020

(65) Prior Publication Data
US 2020/0360811 A1   Nov. 19, 2020

Related U.S. Application Data

(63) Continuation of application No. PCT/JP2018/041588, filed on Nov. 9, 2018.

(30) Foreign Application Priority Data

Feb. 6, 2018   (JP) .............................. JP2018-019310

(51) Int. Cl.
*A63F 13/5372* (2014.01)
*A63F 13/5378* (2014.01)
*A63F 13/80* (2014.01)

(52) U.S. Cl.
CPC ...... *A63F 13/5372* (2014.09); *A63F 13/5378* (2014.09); *A63F 13/80* (2014.09)

(58) Field of Classification Search
CPC .. A63F 13/5372; A63F 13/5378; A63F 13/80; A63F 2300/303; A63F 2300/307
(Continued)

(56) References Cited

U.S. PATENT DOCUMENTS 6,601,851 B1 * 8/2003 Sakamoto ................. A63F 1/00
                                                                     273/292
7,144,013 B2 * 12/2006 Tanaka ...................... A63F 1/04
                                                                     273/308
(Continued)

FOREIGN PATENT DOCUMENTS

JP        4975880 B1     7/2012
JP     2017196338 A     11/2017

OTHER PUBLICATIONS

Code of Joker, Oct. 29, 2014, [online], retrieved on: Jan. 7, 2019, p. 1-3, URL, http://coj.sega.jp/ver1.0/game/sate04deck.html (For concise explanation of relevance, please see International Search Report for PCT/JP2018/041588 with English translation.).
(Continued)

*Primary Examiner* — Allen Chan
(74) *Attorney, Agent, or Firm* — HEA Law PLLC

(57) ABSTRACT

Provided is a game system including at least one processor configured to execute predetermined game processing based on an object group including a plurality of objects, the at least one processor being configured to: display first object information on each of the plurality of objects included in the object group, on a display; add a selected object to the object group; and display second object information for identifying the object added to the object group, on the display.

20 Claims, 24 Drawing Sheets

(58) Field of Classification Search
USPC .......................................................... 463/31
See application file for complete search history.

(56) References Cited

U.S. PATENT DOCUMENTS

2006/0258425 A1* 11/2006 Edidin ................ G07F 17/3293
463/16
2007/0202952 A1* 8/2007 Francis ..................... A63F 1/02
463/42
2008/0242389 A1* 10/2008 Jackson .................. G07F 17/32
463/13

OTHER PUBLICATIONS

International Search Report for PCT/JP2018/041588 with English translation.
Form PCT/ISA/237 with PCT/IB/338 and PCT/IB/373 of PCT/JP2018/041588.
Office Action dated Aug. 28, 2018, for corresponding JP application No. 2018-019310 with English translation.
Office Action dated Jan. 15, 2019, for corresponding JP application No. 2018-019310 with English translation.

* cited by examiner

FIG.7
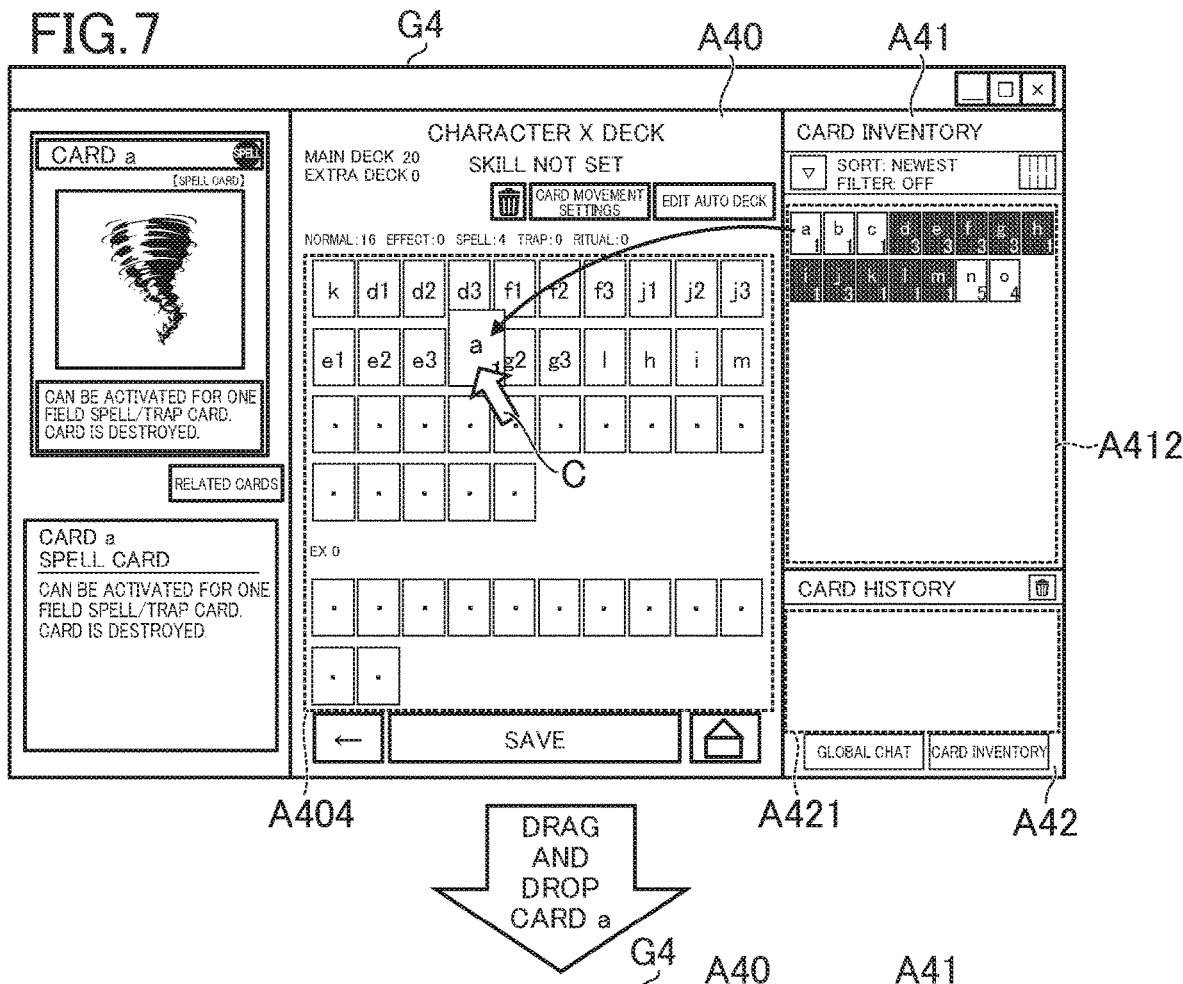
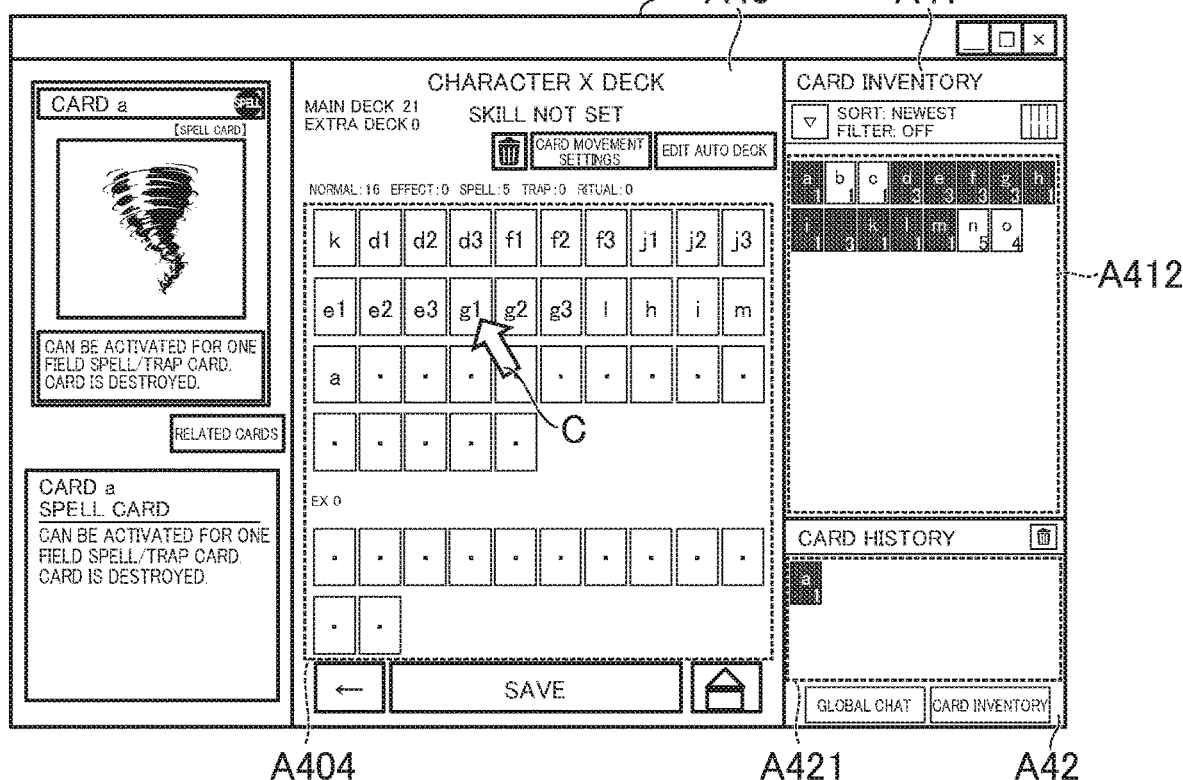

FIG.9
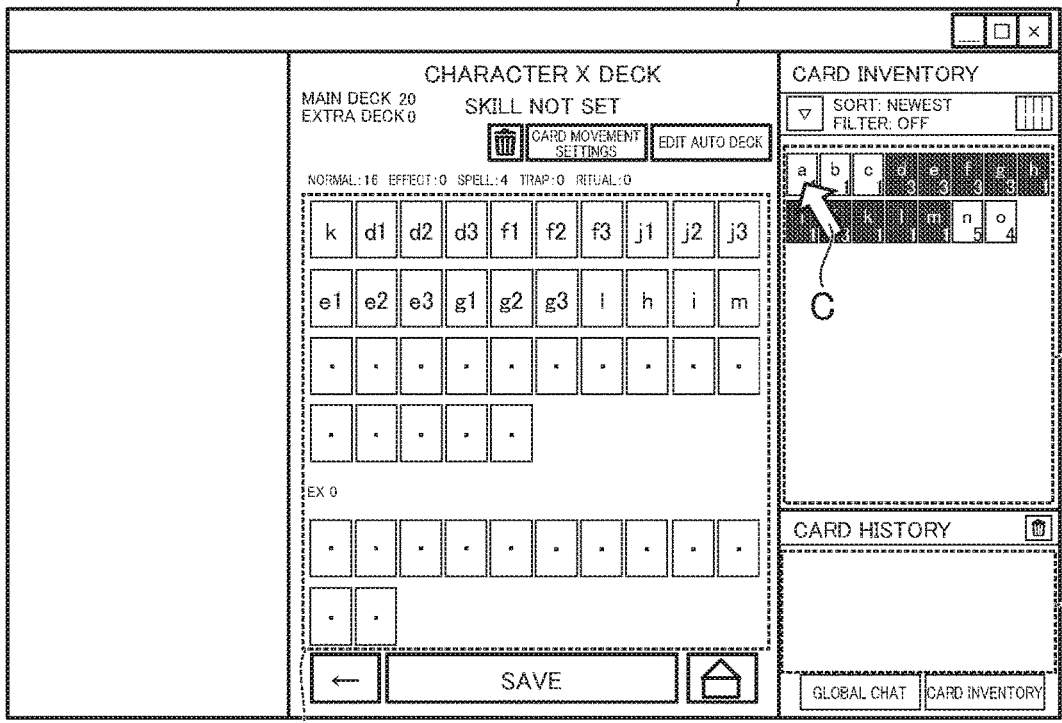
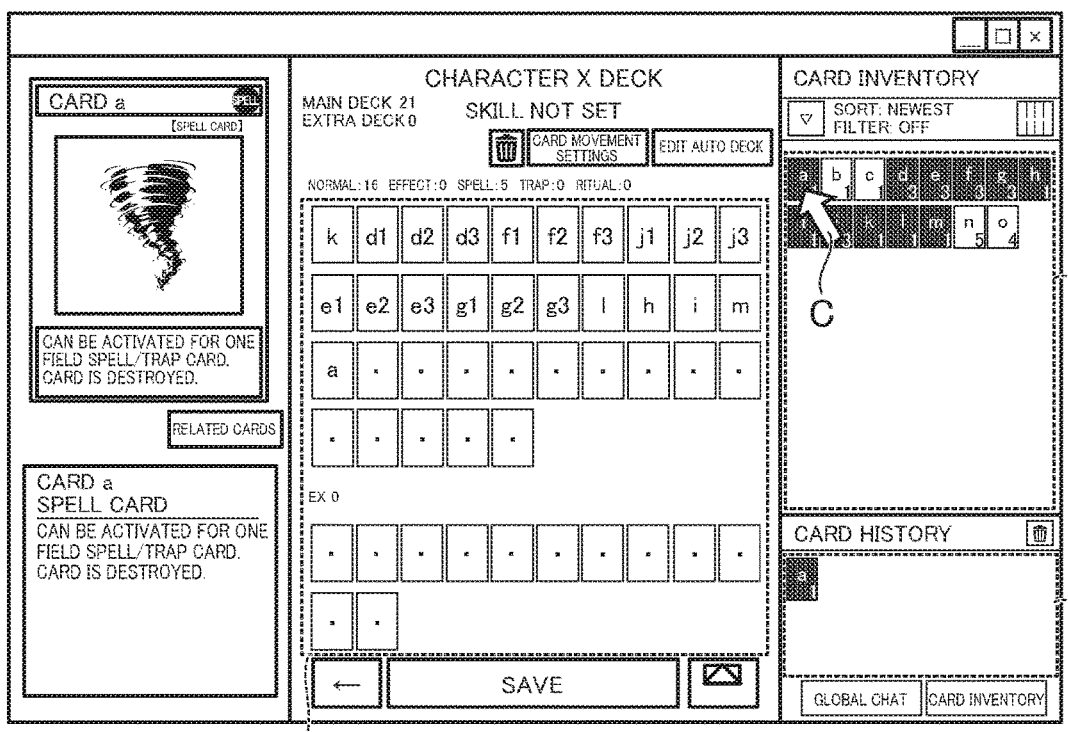

FIG.10
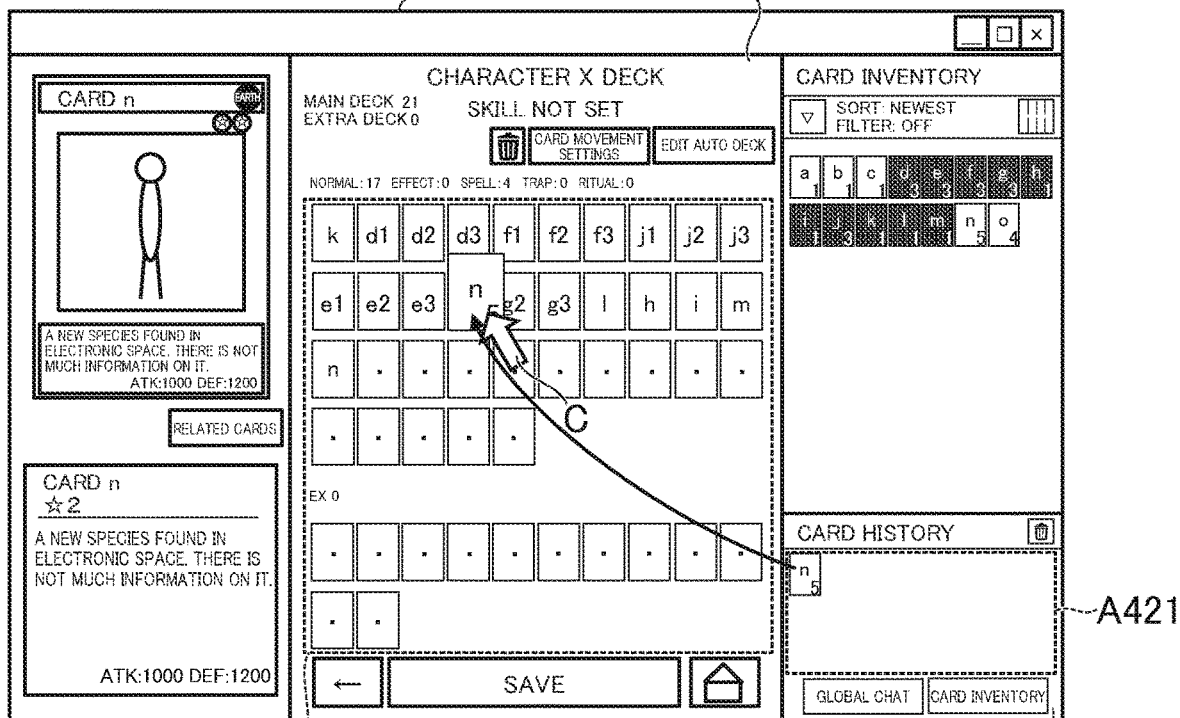
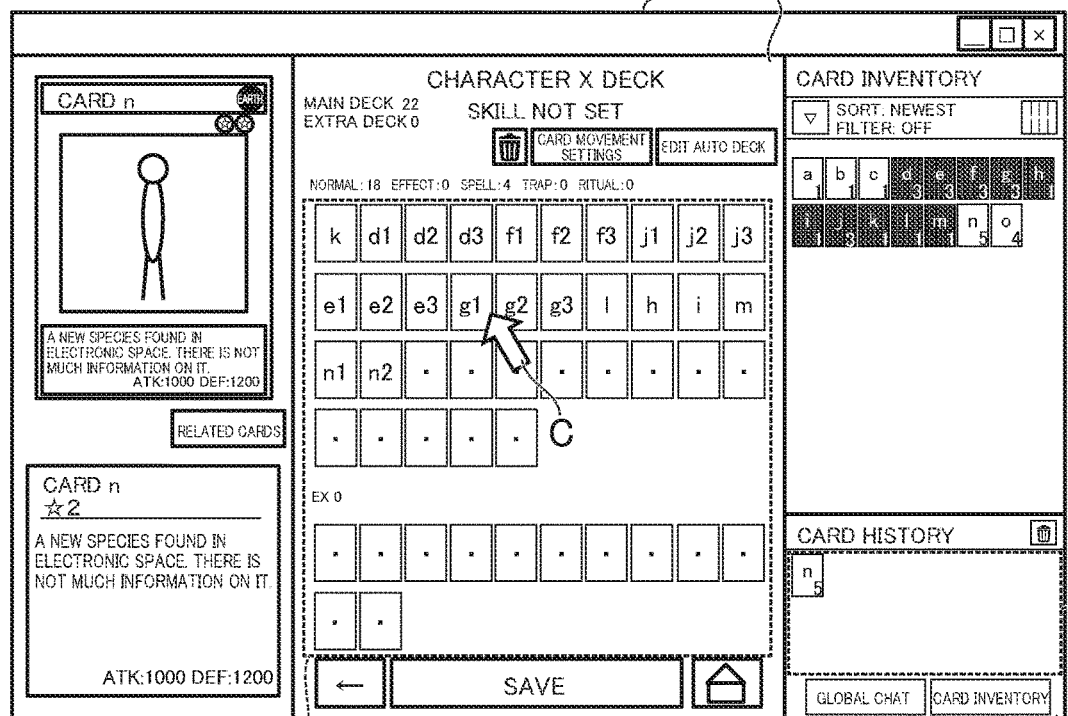

FIG.11
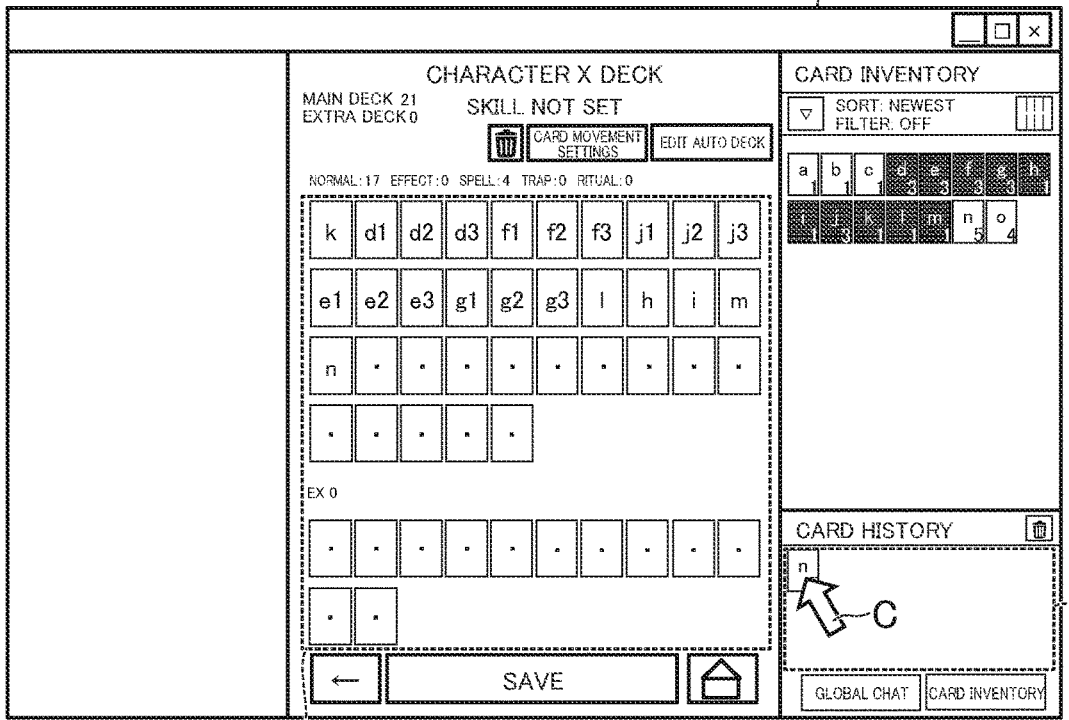
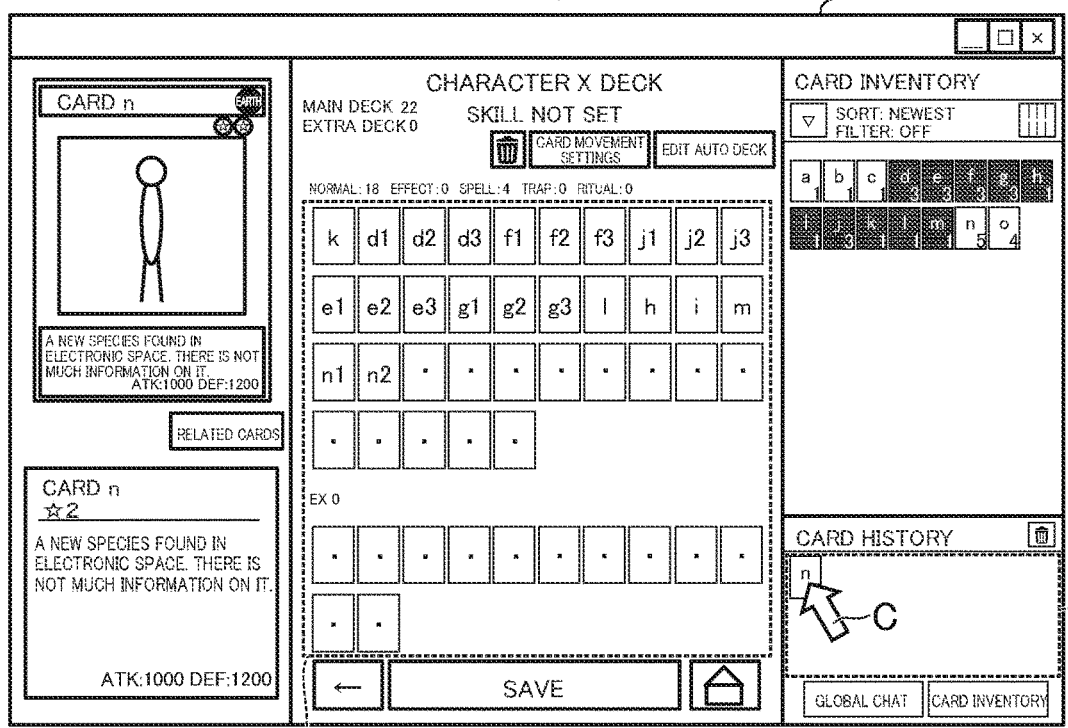

FIG.14
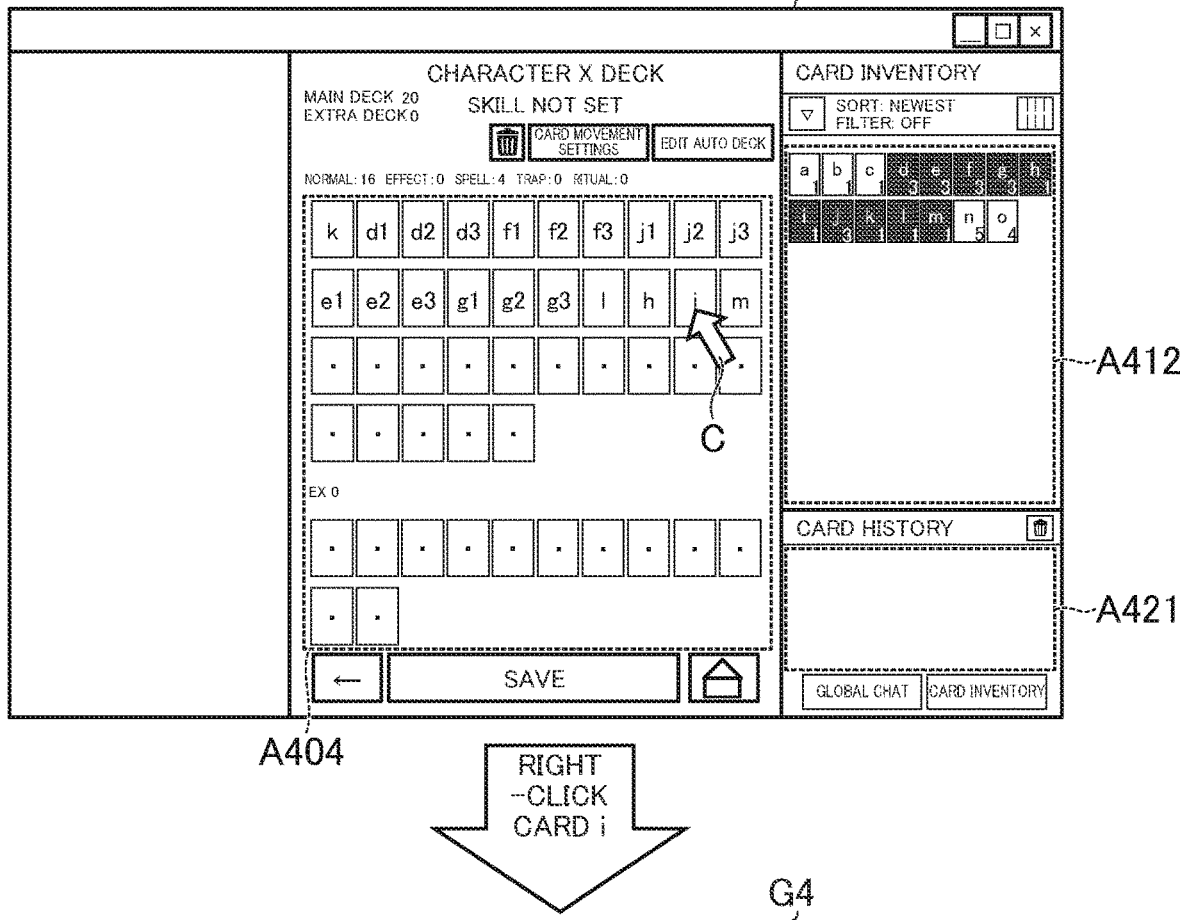
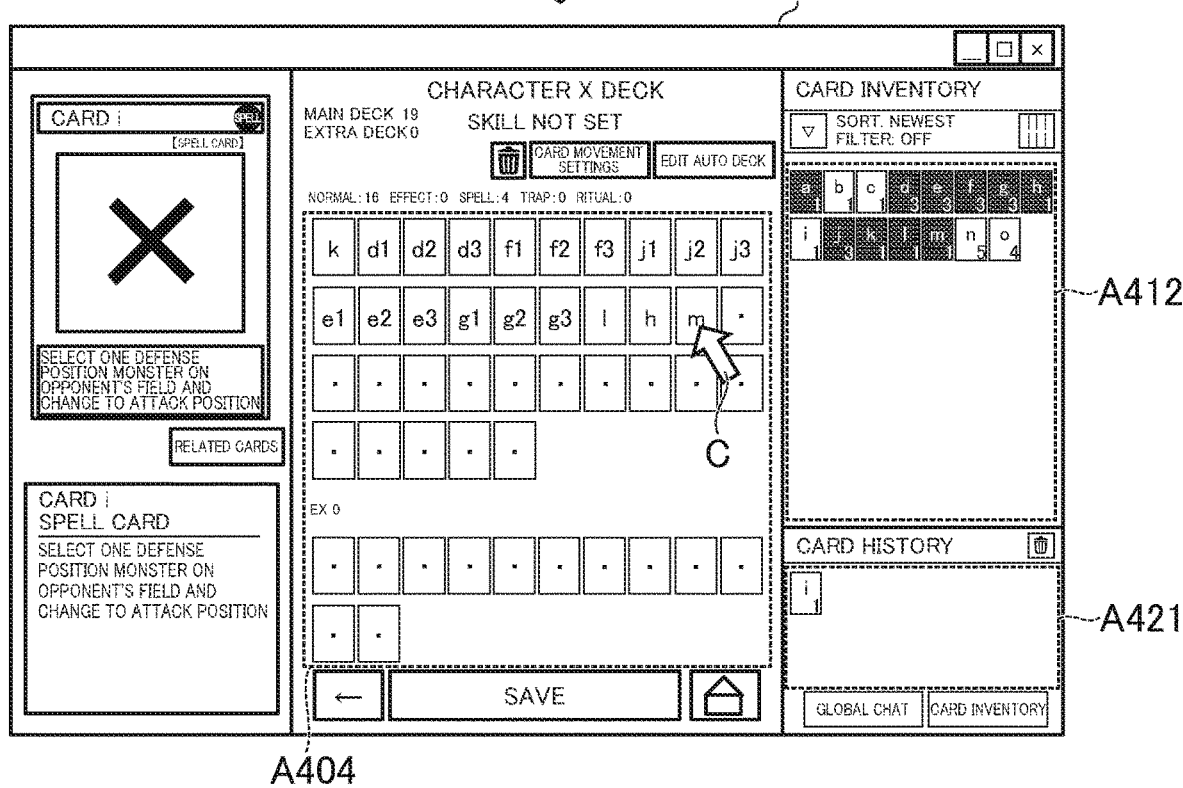

FIG.16

| CARD NUMBER | NAME | PROPERTY | LEVEL | RARITY | DETAILED INFORMATION ||||||| IMAGE |
| --- | --- | --- | --- | --- | --- | --- | --- | --- | --- | --- | --- |
| | | | | | ATTRIBUTE | TYPE | ATK | DEF | EFFECT EXPLANATION | MONSTER INFORMATION | |
| c00001 | a | SPELL | - | NORMAL | - | - | - | - | THE FIELD SPELL … | - | aaa.jpg |
| c00002 | b | NORMAL | 4 | RARE | LIGHT | THUNDER | 1200 | 600 | - | A THUNDER ATTACK IS UNEXPECTEDLY … | bbb.jpg |
| c00003 | c | TRAP | - | SUPER RARE | - | - | - | - | TO PERFORM A RITUAL SUMMONS … | - | ccc.jpg |
| c00004 | d | COMMON | 3 | NORMAL | DARK | FIEND | 800 | 1000 | - | A SMALL OGRE WHO LIVES IN THE DARK … | ddd.jpg |
| ⋮ | ⋮ | ⋮ | ⋮ | ⋮ | ⋮ | ⋮ | ⋮ | ⋮ | ⋮ | ⋮ | ⋮ |

| USER ID | CARD NUMBER | POSSESSED NUMBER | SERIAL NUMBER |
|---|---|---|---|
| u00001 | c00001 | 1 | s00001 |
| | c00002 | 1 | s00002 |
| | c00003 | 1 | s00003 |
| | c00004 | 3 | s00004 |
| | | | s00005 |
| | | | s00006 |
| ... | ... | ... | ... |

| USER ID | CHARACTER NAME | DECK ID | LOCK INFORMATION | DECK CONTENTS INFORMATION ||||
|---|---|---|---|---|---|---|---|
| | | | | NAME | CARD NUMBER | SERIAL NUMBER | |
| u00001 | CHARACTER X | d00001 | — | CHARACTER X DECK | c00011 | s00021 | |
| | | | | | c00004 | s00004 | |
| | | | | | c00004 | s00005 | |
| | | | | | c00004 | s00006 | |
| ... | ... | ... | ... | ... | ... | ... | |

| DECK ID | POSSESSED CARD INFORMATION | | | DECK CONTENTS INFORMATION | | | DISPLAY INFORMATION | | |
|---|---|---|---|---|---|---|---|---|---|
| | CARD NUMBER | POSSESSED NUMBER | SERIAL NUMBER | NAME | CARD NUMBER | SERIAL NUMBER | ORDER | CARD NUMBER | SERIAL NUMBER |
| d00001 | c00001 | 1 | s00001 | CHARACTER X DECK | c00011 | s00021 | 1 | c00003 | s00003 |
| | c00002 | 1 | s00002 | | c00004 | s00004 | 2 | c00015 | s00027 |
| | c00003 | 1 | s00003 | | c00004 | s00005 | 3 | c00001 | s00001 |
| | ... | ... | ... | | ... | ... | ... | ... | ... |

DT1

US 11,266,908 B2

GAME SYSTEM, GAME CONTROL DEVICE, AND INFORMATION STORAGE MEDIUM

CROSS-REFERENCE TO RELATED APPLICATION

This application is a continuation application of International Application PCT/JP2018/041588 filed on Nov. 9, 2018, which claims priority from Japanese application JP 2018-019310 filed on Feb. 6, 2018, the content of these applications is incorporated herein by reference in their entirety.

1. FIELD OF THE INVENTION

The present invention relates to a game system, a game control device, and an information storage medium.

2. DESCRIPTION OF THE RELATED ART

Hitherto, games using an object group, for example, a deck, have been known. For example, in Japanese Patent Application Laid-open No. 2017-196338, there is described a game system in which a user edits a deck by selecting a card to be added to the deck in a game in which the user uses the cards incorporated in the deck to play a match with another user.

SUMMARY OF THE INVENTION

In the technology of Japanese Patent Application Laid-open No. 2017-196338, there are an infinite number of card combinations, and users often edit the deck by trial and error by repeatedly adding cards. In this case, during the editing, the user may lose track of which cards have been added to the deck. In addition, there is also a problem in that the user is required to find each card added to the deck from a list of the cards possessed by the user. Therefore, with the technology of Japanese Patent Application Laid-open No. 2017-196338, the editing work of the deck is complicated and places a burden on the user.

The present invention has been made in view of the problem described above, and it is an object of the present invention to provide a game system, a game control device, and an information storage medium, which are capable of reducing a burden on a user.

Solution to Problem

In order to solve the above-mentioned problem, according to at least one aspect of the present invention, there is provided a game system including at least one processor configured to execute predetermined game processing based on an object group including a plurality of objects, the at least one processor being configured to: display first object information on each of the plurality of objects included in the object group, on a display; add a selected object to the object group; and display second object information for identifying the object added to the object group, on the display.

According to at least one aspect of the present invention, there is provided a game control device including at least one processor configured to execute predetermined game processing based on an object group including a plurality of objects, the at least one processor being configured to: display first object information on each of the plurality of objects included in the object group, on a display; add a selected object to the object group; and display second object information for identifying the object added to the object group, on the display.

BRIEF DESCRIPTION OF THE DRAWINGS

FIG. 7 is a diagram for illustrating how a card is added to the deck by drag and drop.

FIG. 9 is a diagram for illustrating how a card is added to the deck by right-clicking.

FIG. 10 is a diagram for illustrating how a card is added to the deck by drag and drop.

FIG. 11 is a diagram for illustrating how a card is added to the deck by right-clicking.

FIG. 14 is a diagram for illustrating how a card is removed from the deck by right-clicking.

FIG. 16 is a table for showing a data storage example of a card information database.

FIG. 17 is a table for showing a data storage example of a possessed card database.

FIG. 18 is a table for showing a data storage example of a deck database.

FIG. 19 is a table for showing a data storage example of deck edit data.

DETAILED DESCRIPTION OF THE INVENTION

1. Overall Configuration of Game System

Figure 1:
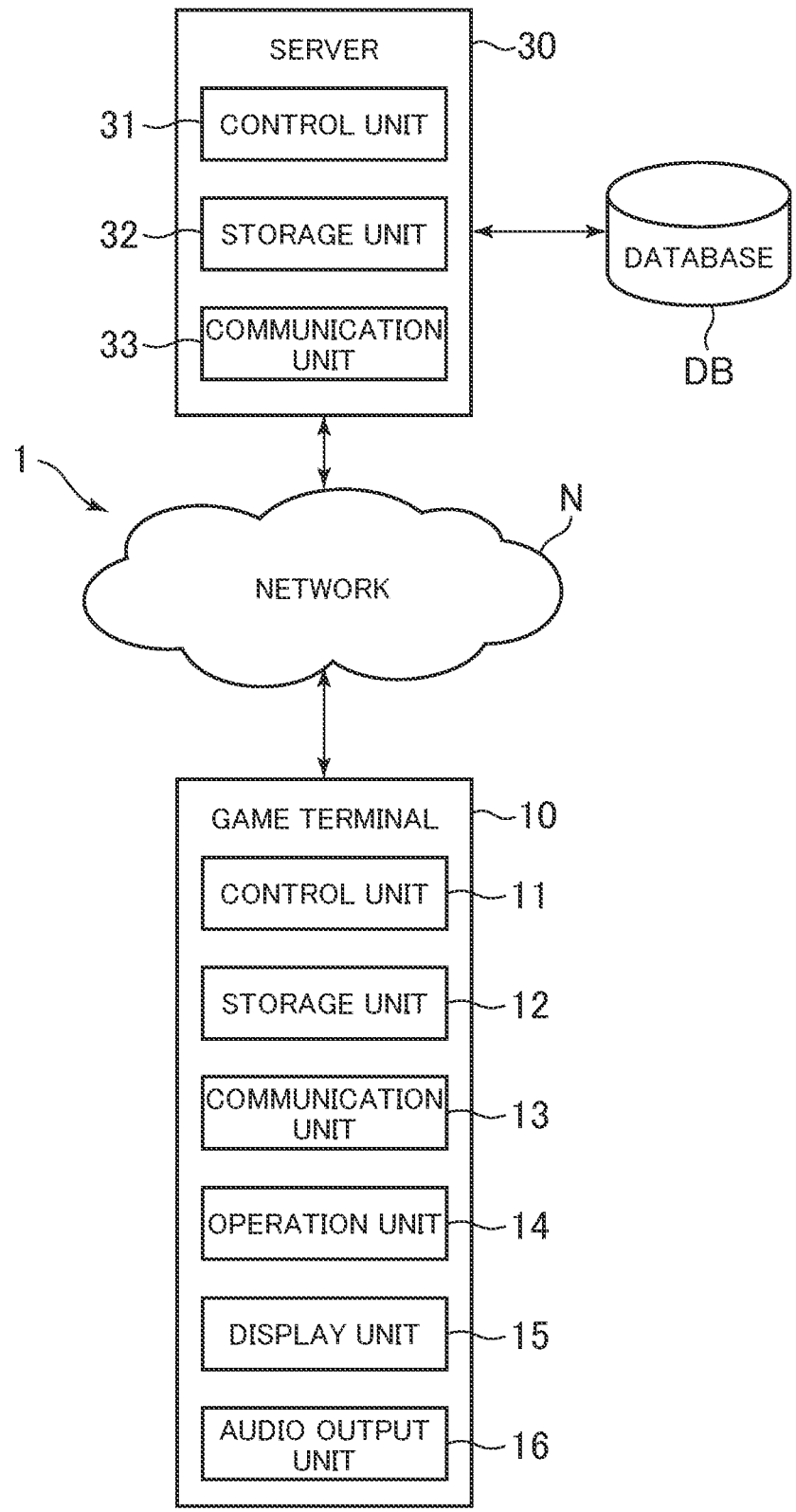
FIG. 1 is a diagram for illustrating an overall configuration of a game system according to at least one embodiment of the present invention.

Now, at least one exemplary embodiment of the present invention is described with reference to the drawings. FIG. 1 is a diagram for illustrating an overall configuration of a game system according to at least one embodiment of the present invention. As illustrated in FIG. 1, a game system 1 according to at least one embodiment includes a game terminal 10 and a server 30. The game terminal 10 and the server 30 are capable of communicating data to/from each other through a network N. In FIG. 1, there is illustrated one game terminal 10 and one server 30, but a plurality of those may be arranged.

The game terminal 10 is a computer to be operated by a user. For example, the game terminal 10 is a personal computer, a cell phone (including a smartphone), a portable information terminal (including a tablet computer), a portable game machine, a console game machine (consumer game machine), or an arcade game machine.

As illustrated in FIG. 1, the game terminal 10 includes a control unit 11, a storage unit 12, a communication unit 13, an operation unit 14, a display unit 15, and an audio output unit 16. The control unit 11 includes at least one microprocessor, and is configured to execute information processing in accordance with a program stored in the storage unit 12. The storage unit 12 includes a main storage (for example, RAM) and an auxiliary storage (for example, nonvolatile semiconductor memory, hard disk drive, or solid-state drive), and stores the program and data. The communication unit 13 includes a communication module and a communication interface.

The operation unit 14 is an input device for a user to perform various operations. The display unit 15 is, for example, a liquid crystal display or an organic EL display. The audio output unit 16 is, for example, a speaker or headphones. In FIG. 1, the operation unit 14 and the display unit 15 are illustrated separately, but the operation unit 14 and the display unit 15 may be integrally formed as a touch panel. The operation unit 14 may be a pointing device, for example, a mouse, a button (key), a lever (stick), or the like. Further, the operation unit 14 may be configured such that the user performs an operation by voice or a gesture.

The server 30 is a server computer. As illustrated in FIG. 1, the server 30 includes a control unit 31, a storage unit 32, and a communication unit 33. The control unit 31, the storage unit 32, and the communication unit 33 are the same as the control unit 11, the storage unit 12, and the communication unit 13, respectively, of the game terminal 10. The server 30 accesses a database DB. The database DB may be built in the server 30, or may be built in a server computer separate from the server 30.

For example, a program and data are supplied to the game terminal 10 or the server 30 through the network N to be stored in the storage unit 12 or the storage unit 32, respectively. The game terminal 10 or the server 30 may include a component (for example, optical disc drive or memory card slot) to be used for reading the program and the data stored in an information storage medium (for example, optical disc or memory card). Then, the program and the data may be supplied to the game terminal 10 or the server 30 through the information storage medium.

2. Outline of Game Processing to be Executed in Game System

The game system 1 is configured to execute predetermined game processing based on an object group including a plurality of objects.

An object is, for example, a target that may be used in game processing. For example, the object is a card, a character, or an item.

The term "object group" is, for example, a generic term for a group including one or a plurality of objects. For example, when the object group includes a plurality of objects, the object group can be said to be a group representing the entirety of the plurality of objects, or can be said to be a collection of objects. For example, among objects associated with user identification information (for example, user ID or user name), the object group is a collection of objects specified as objects to be used in game processing. Moreover, for example, the object group may also be referred to as a deck or a team, or as a cluster of items or creatures that are not particularly referred to as a deck or a team (which is referred to as, for example, an army, a corps, or a crowd).

The game processing is, for example, processing to be executed by using the objects included in the object group. For example, the game processing uses the objects included in the object group to perform a match with an object group of a match opponent. The match opponent may be another user or a computer (CPU). As another example, the game processing uses the objects included in the object group to perform a match with the object group of the match opponent in cooperation with a plurality of users. The cooperating partners may be another user or a computer. As another example, the game processing uses the objects included in the object group to strengthen another object. In the case of processing referred to as combination processing, the object group is a group of objects specified as materials. As another example, the game processing is processing of buying, selling, or discarding an object included in the object group. As another example, the game processing is processing of exchanging an object included in the object group with another user. As another example, the game processing is processing of giving an object included in the object group to another user as a present.

In at least one embodiment, a card corresponds to an object, a deck, which is a stack of cards, corresponds to an object group, and a match corresponds to game processing. Therefore, in at least one embodiment, the word "card" can be read as "object", the word "deck" can be read as "object group", and the word "match" can be read as "game processing".

For example, when a game program stored in the storage unit 12 of the game terminal 10 is activated, game processing is executed based on the deck including a plurality of cards. In at least one embodiment, there is mainly described an edit function for editing the deck.

The term "edit" refers to, for example, changing information on the deck, and may be changing the contents of the deck or changing the name of the deck. The contents of the deck are, for example, the combination of cards included in the deck. For example, the contents of the deck are changed by adding a card to the deck or removing a card from the deck. The expression a "card included in the deck" means, for example, that a card is incorporated in the deck, and that the card is a part of the deck. For example, when a card is included in the deck, the card can be used.

The term "add" refers to, for example, changing from a state in which a card is not included in the deck to a state in which the card is included in the deck. For example, "add" refers to incorporating a card into the deck such that the card is a part of the deck. Moreover, for example, "add" refers to associating identification information on the card with identification information on the deck. Moreover, for example, when a first list showing the cards included in the deck and a second list showing the cards possessed by the user or the cards not included in the deck are displayed, "add" refers to moving the card from the second list to the first list.

The term "remove" refers to, for example, changing from a state in which a card is included in the deck to a state in which the card is not included in the deck. For example, "remove" refers to taking a card out of the deck such that the card is no longer included in the deck. Moreover, for example, "remove" refers to releasing a state in which identification information on the card and identification information on the deck are associated. When a first list showing the cards included in the deck and a second list showing the cards possessed by the user or the cards not included in the deck are displayed, "remove" refers to moving the card from the first list to the second list.

For example, when predetermined information is output from the operation unit 14 after the game program is activated, a mode selection image for selecting a mode relating to the edit function is displayed on the display unit 15.

Figure 2:
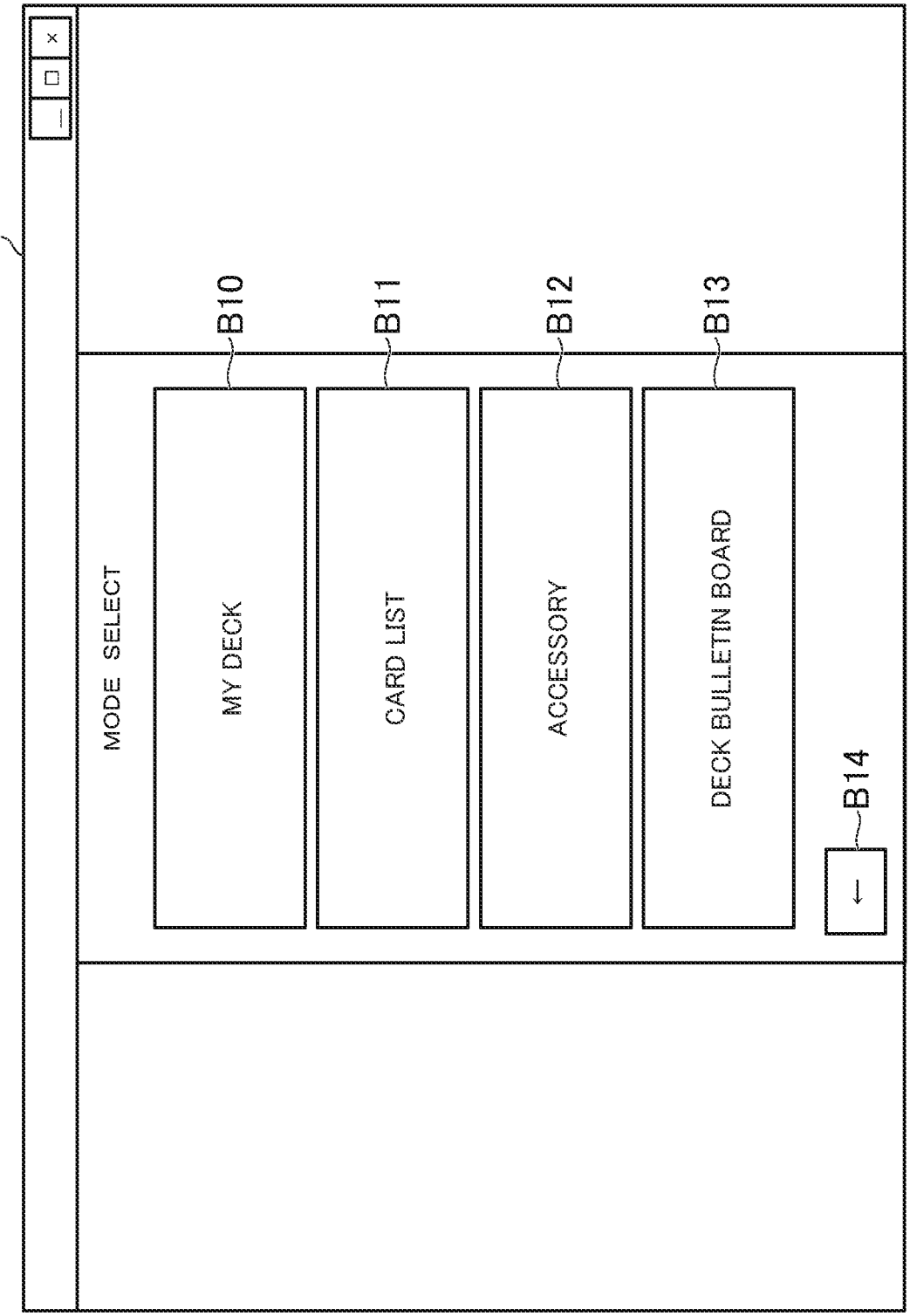
FIG. 2 is a diagram for illustrating an example of a mode selection image.

FIG. 2 is a diagram for illustrating an example of the mode selection image. As illustrated in FIG. 2, buttons B10 to B14 are displayed on a mode selection image G1. For example, the button B10 is a button for checking the contents of the deck and editing the deck. For example, the button B11 is a button for displaying the cards possessed by the user. For example, the button B12 is a button for changing the appearance of a back surface of a card and the appearance of a field in which a match is to be performed. For example, the button B13 is a button for displaying an electronic bulletin board for sharing information on the deck. For example, the button B14 is a button for transitioning to the image immediately preceding the mode selection image.

In at least one embodiment, there is mainly described processing for a case in which the button B10 is selected. For example, when the user operates the operation unit 14 and selects the button B10, a deck selection image for selecting a deck is displayed on the display unit 15.

Figure 3:
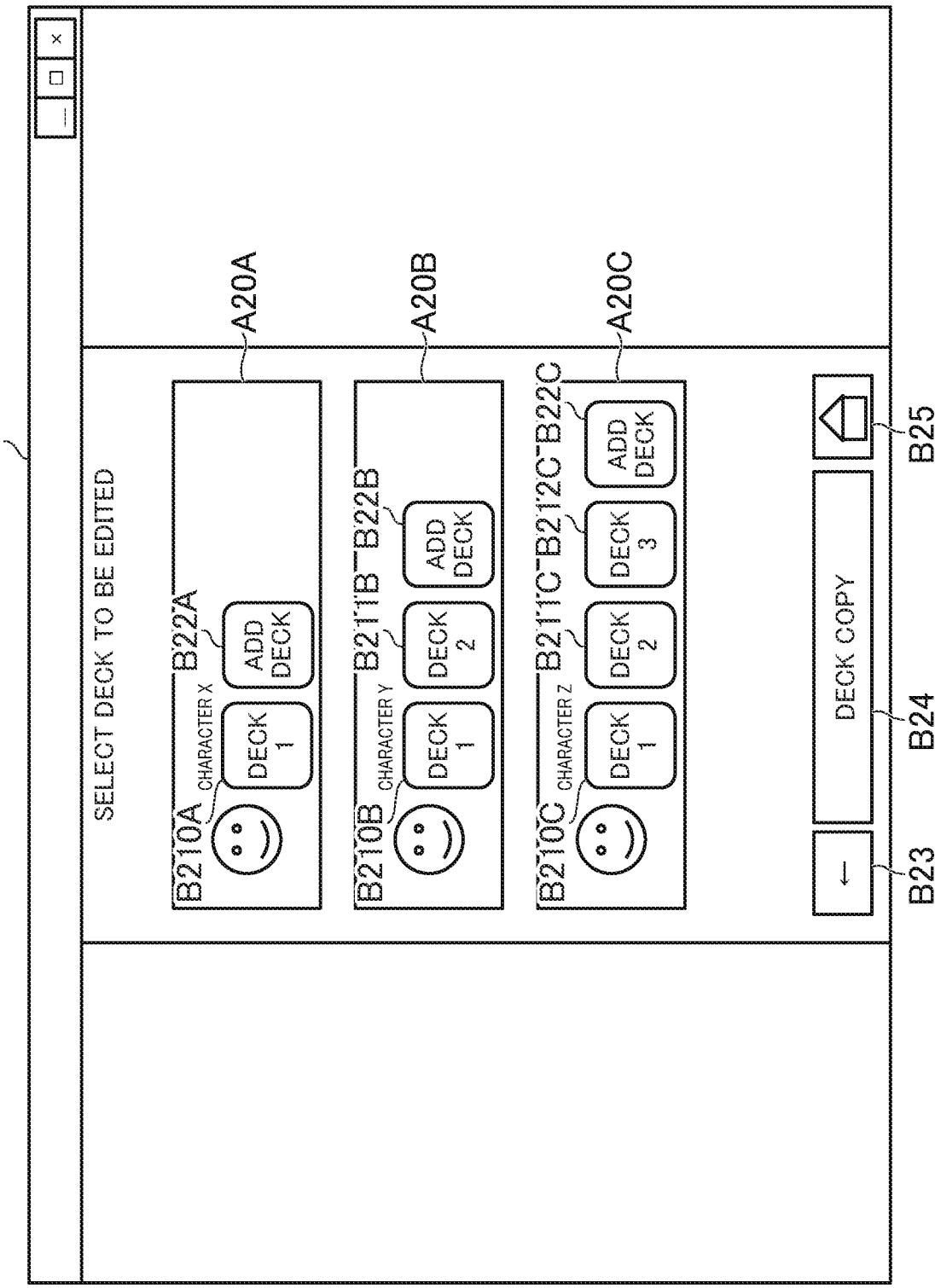
FIG. 3 is a diagram for illustrating an example of a deck selection image.

FIG. 3 is a diagram for illustrating an example of the deck selection image. In at least one embodiment, a plurality of characters are prepared, and a deck is prepared for each character. In the example illustrated in FIG. 3, three characters, namely, a "character X", a "character Y", and a "character Z", can be used, and a deck selection image G2 includes display regions A20A to A20C, which each correspond to one of those three characters.

For example, the display region A20A is a display region corresponding to the "character X". The "character X" is associated with one deck, and the "character X" uses that deck. A button B210A for selecting the one deck is displayed in the display region A20A. When the user selects a button B22A, a deck that can be used by the "character X" added.

For example, the display region A20B is a display region corresponding to the "character Y". The "character Y" is associated with two decks, and the "character Y" uses any one of those two decks. A button B210B for selecting a first deck and a button B211B for selecting a second deck are displayed in the display region A20B. When the user selects a button B22B, a deck that can be used by the "character Y" is added.

For example, the display region A20C is a display region corresponding to the "character Z". The "character Z" is associated with three decks, and the "character Z" uses any one of those three decks. A button B210C for selecting a first deck, a button B211C for selecting a second deck, and a button B211C for selecting a third deck are displayed in the display region A20C. When the user selects a button B22C, a deck that can be used by the "character Z" is added.

In the deck selection image G2, a button B23 for returning to the mode selection image G1, a button B24 for copying the contents of the deck, and a button B25 for returning to the top image are displayed.

For example, when the user selects any one of the buttons B210A, B210B, B211B, B210C, B211C, and B212C, a deck edit image for editing the deck is displayed on the display unit 15. As an example, there is now described processing for a case in which the user selects the button B210A and edits the deck of the "character X". For example, when the user selects the button B210A, a deck contents image showing the contents of the deck of the "character X" is displayed on the display unit 15.

Figure 4:
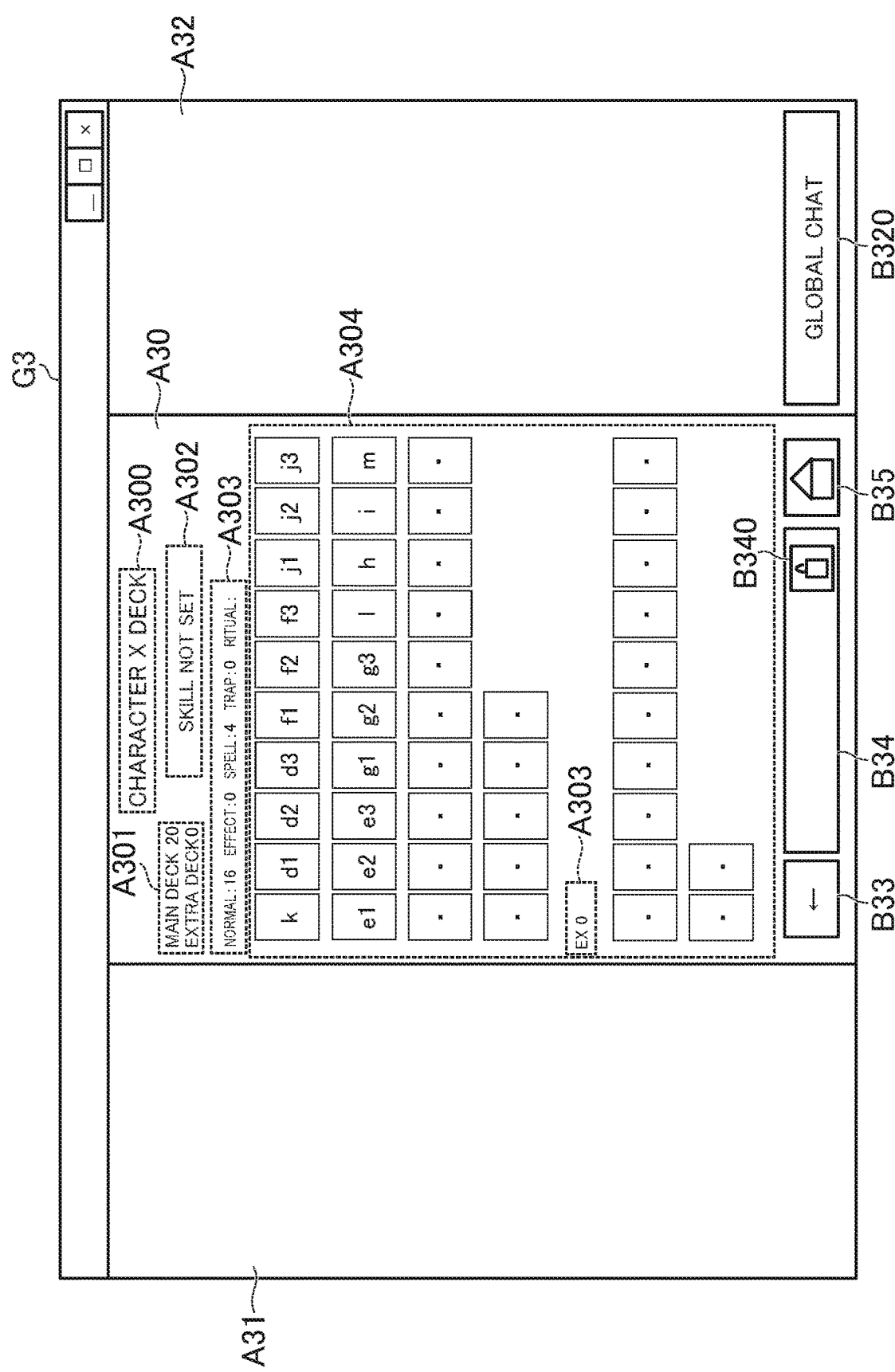
FIG. 4 is a diagram for illustrating an example of a deck contents image.

FIG. 4 is a diagram for illustrating an example of the deck contents image. As illustrated in FIG. 4, a deck contents image G3 includes display regions A30 to A32. For example, the display region A30 is a region for displaying various pieces of information on the deck, and includes display regions A300 to A304.

For example, the name of the deck is displayed in the display region A300. For example, in the display region A301, the number of cards included in the deck is displayed. For example, in the display region A302, the contents of a skill set for the character are displayed. For example, in the display region A303, the number of cards included in the deck is displayed for each type of card.

For example, in the display region A304, the cards included in the deck are displayed in a predetermined order (for example, in descending order of rarity, in descending order of level, in order of card type, and in descending order of offensive power or defensive power). In at least one embodiment, the number of cards incorporated in a deck that can be used in a match is from 20 to 30, and up to 35 cards can be displayed in the display region A304. The number of cards that can be incorporated in the deck may be any number, for example, from about 10 to about 50 cards, or may be equal to or more than that number of cards, or equal to or less than that number of cards. Moreover, the number of cards that can be incorporated in the deck is not required to be particularly limited.

In the example of FIG. 4, the deck of the "character X" is including 20 cards, and those 20 cards are displayed in a predetermined order in the display region A30. In at least one embodiment, in order to simplify the drawing, as the images of the cards, only the name (an alphabet letter, such as "k", indicated in the display region A304 is the name of the card) is illustrated, but various pieces of information, such as an illustration of the character or an item drawn on the card, parameters such as offensive power and defensive power, effects possessed by the card, and a card level or rarity, may be displayed on the card.

A restriction may be placed on the number of cards having the same name to be incorporated in the deck. For example, the number of cards having the same name to be incorporated in the deck may be restricted to one, or a plurality of such cards may be incorporated. In at least one embodiment, up to three cards having the same name can be incorporated in the deck, but two of such cards or four or more of such cards may be incorporated in the deck. In at least one embodiment, the plurality of cards incorporated in the deck are distinguished from each other by adding a numeral after the alphabet letter indicating the name of the card on the drawing, such as "d1", "d2", and "d3".

In the example of FIG. 4, as shown in the display region A304, the deck of the "character X" has one "card k", three "cards d", three "cards f", three "cards j", three "cards e", three "cards g", one "card l", one "card h", one "card i", and one "card m". In the display region A304, a card is not displayed in the regions indicated by the symbol "•" (dot), but when a card is added to the deck, the card is displayed in those regions.

For example, among the cards displayed in the display region A30, detailed information on a selected card is displayed in the display region A31. In the example of FIG. 4, a card is not selected, and detailed information on a card is not displayed in the display region A31. The card can be selected by a certain operation by the user. For example, the card is selected by a tap, a double tap, a click, or a double click.

Moreover, for example, the content of a chat between users is displayed in the display region A32. A button B320 for displaying the content of the chat is displayed in the display region A32, and the user selects the button B320 to switch between whether the content of the chat is displayed or not displayed in the display region A32. In the example of FIG. 4, the chat is set to "hide display", and thus the content of the chat is not displayed in the display region A32.

Moreover, for example, a button B33 for returning to the deck selection image G2, a button B34 for editing the deck, and a button B35 for returning to the top image are displayed in the deck contents image G3. For example, the button B34 includes a button B340 for locking editing of the deck, and when the user selects the button B340, the displayed deck is locked such that the deck is not editable. For example, when the user selects the button B34 without selecting the button B340, a deck edit image for editing the displayed deck is displayed on the display unit 15.

Figure 5:
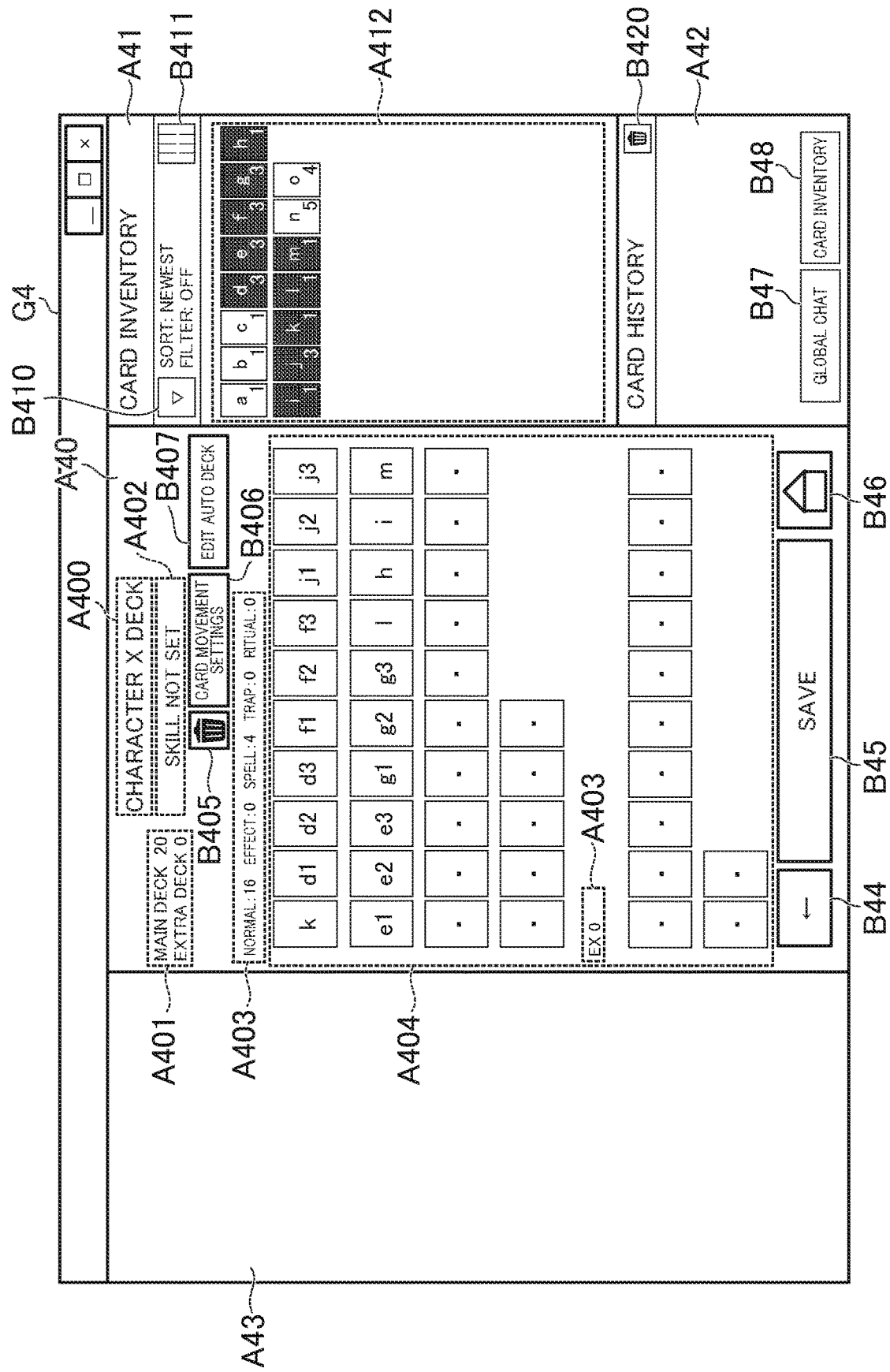
FIG. 5 is a diagram for illustrating an example of a deck edit image.

FIG. 5 is a diagram for illustrating an example of the deck edit image. As illustrated in FIG. 5, the deck edit image G4 includes display regions A40 to A43. For example, the display region A40 is a region for displaying the cards included in the deck, and includes display regions A400 to A404.

The contents of the display regions A400 to A404 are the same as those of the display regions A300 to A304 of the deck contents image G3. Therefore, at the point at which the deck edit image G4 has just been displayed, the cards displayed in the display region A404 are the same as the cards displayed in the display region A304 of the deck contents image G3. The deck can be given any name by inputting a string of letters or symbols in the display region A400. Further, a skill can be set for a character by selecting the display region A402.

In the display region A40, a button B405 for removing all the cards included in the deck, a button B406 for performing a setting relating to deck editing, and a button B407 for automatically building a deck are displayed. For example, when the user selects the button B405, the number of cards included in the deck becomes 0, and thus no cards are displayed in the display region A404. For example, when the user selects the button B407, a combination of cards determined based on a predetermined rule is selected from among the cards possessed by the user and incorporated in the deck.

For example, the display region A41 is a region for displaying the cards possessed by the user. The display region A41 includes a button B410 for changing a card sorting order and a card narrowing-down condition, a button B411 for changing a card display format, and a display region A412 for displaying each card.

For example, the cards possessed by the user are displayed in the display region A412, and therefore both the cards included in the deck and the cards not included in the deck are displayed. The cards displayed in the display region A412 and the cards displayed in the display region A404 have the same image. Similarly to the display region A404, in order to simplify the drawing, detailed information on the card is omitted and only the name is shown in the display region A412.

In the display region A404, a plurality of cards having the same name are displayed by using different images from each other, but in the display region A412, a plurality of cards having the same name are combined into one image, and the number of those cards is displayed. In the example of FIG. 5, in the display region A412, the number of cards is displayed at the lower right of the alphabet letter indicating the name of the card. The user possesses one "card a", one "card b", one "card c", three "cards d", three "cards e", three "cards f", three "cards g", one "card h", one "card i", three "cards j", one "card k", one "card l", one "card m", five "cards n", and four "cards o".

For example, in the display region A412, when all of the possessed cards of three or less are added to the deck, the color of the card changes. For example, when all of the possessed cards of three or less are added to the deck, the card is grayed out (schematically indicated by halftone dots in FIG. 5). In the example of FIG. 5, there are three cards for each of "card d", "card e", "card f", "card g", and "card j", and all of the possessed cards of those card types are incorporated in the deck. Therefore, in the display region A412, those five cards are grayed out. In at least one embodiment, cards having a possessed number of four or more cards are not grayed out even when three of those possessed cards are added to the deck.

Even when there are less than three cards incorporated in the deck, in a case in which the possessed number of a card is one or two and all of those are incorporated in the deck, the card is grayed out. In the example of FIG. 5, there is one possessed card for each of "card h", "card i", "card k", "card l", and "card m", which means that all of the possessed cards of those card types are incorporated in the deck. Therefore, in the display region A412, those five cards are grayed out.

For example, the display region A42 is a region for displaying the cards added to the deck. The display region A42 may display only the cards added to the deck, but in at least one embodiment, the cards removed from the deck are also displayed. Therefore, the display region A42 displays both the cards added to the deck and the cards removed from the deck. In the example of FIG. 5, the contents of the deck have not changed and no cards have been added to the deck, and hence no cards are displayed in the display region A42.

For example, a button B420 for deleting a card is displayed in the display region A42. When the user selects the button B420, the card displayed in the display region A42 is deleted. However, deletion of a card from the display region A42 does not mean that the card added to the deck is removed or that the removed card is returned to the deck. Instead, the deletion only means that the image of the card is deleted from the display region A42.

For example, the display region A43 is a region for displaying detailed information on the card selected by the user. The contents of the display region A43 are the same as those of the display region A31 of the deck contents image G3, and detailed information on a given card selected by the user is displayed. For example, when the user selects the "card a" displayed in the display region A412, detailed information on the "card a" is displayed in the display region A43.

Figure 6:
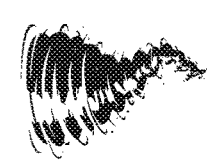
FIG. 6 is a diagram for illustrating how detailed information on a card selected by a user is displayed.

FIG. 6 is a diagram for illustrating how detailed information on the card selected by the user is displayed. In the drawings after FIG. 6, in order to simplify the drawings, reference symbols that are not particularly required to be referred to are omitted. There is now described a case in which the user operates the mouse of the operation unit 14 as an example.

As illustrated in FIG. 6, for example, when the user places a cursor C on the "card a" in the display region A412 and left-clicks, an image of the "card a" is displayed in a display region A430. For example, the "card a" displayed in the display region A430 is larger than the "card a" displayed in the display region A412, and various pieces of information, such as the card name, type, an illustration drawn on the card, and an effect, are displayed.

For example, in the display region A43, a button B431 for displaying a card related to the card selected by the user is displayed. The related card may be, for example, another card required in order to place the card on the field during the match, or another card relating to the effect of the card selected by the user. The related card may be displayed even when the user does not possess the card. Moreover, for example, in the display region A432, information such as the name, type, and effect of the card is displayed in a larger size. When the user does not possess even one related card, the card is grayed out.

Returning to FIG. 5, in the deck edit image G4, a button B44 for returning to the deck contents image G3, a button B45 for storing the deck being edited, a button B46 for returning to the top image, a button B47 for displaying chat content in the display regions A41 and A42, and a button B48 for hiding the contents of the display regions A41 and A42 are displayed. For example, when the user selects the button B44 or the button B47 without selecting the button B45, the deck being edited is not stored.

Next, an operation for adding a card to the deck and an operation for removing a card from the deck in the deck edit image G4 are described.

First, an operation for the user to add a card to the deck is described. For example, when the user performs a predetermined operation in the display region A412, a card displayed in the display region A412 is added to the deck. In this case, drag and drop and right-clicking are each described as an example of the predetermined operation.

FIG. 7 is a diagram for illustrating how a card is added to the deck by drag and drop. As illustrated in FIG. 7, for example, when the user places the cursor C on the "card a" displayed in the display region A412 and drags and drops the "card a" to any position in the display region A40, the "card a" is added to the deck. In other words, the "card a" displayed in the display region A412 is added to the deck by dragging and dropping the "card a" so as to straddle the left edge portion of the display region A41 (boundary between the display regions A41 and A42 and the display region A40). There is only one "card a", and no more can be added, and therefore the "card a" is grayed out in the display region A412.

Of the cards displayed in the display region A412, it is not possible to add the grayed-out cards (for example, "card d") to the deck, and therefore it is not possible to drag and drop those cards from the display region A412 to the display region A40.

As illustrated in FIG. 7, for example, when the "card a" is to be added to the deck, the added "card a" is displayed in the display region A421. Similarly to the display region A412, in order to simplify the drawing, detailed information on the card is omitted, and only the name and the number of cards are shown in the display region A421. For example, when a plurality of cards having different names are dragged and dropped one after another and added to the deck, each of the added plurality of cards is displayed in a line in the display region A42.

Figure 8:
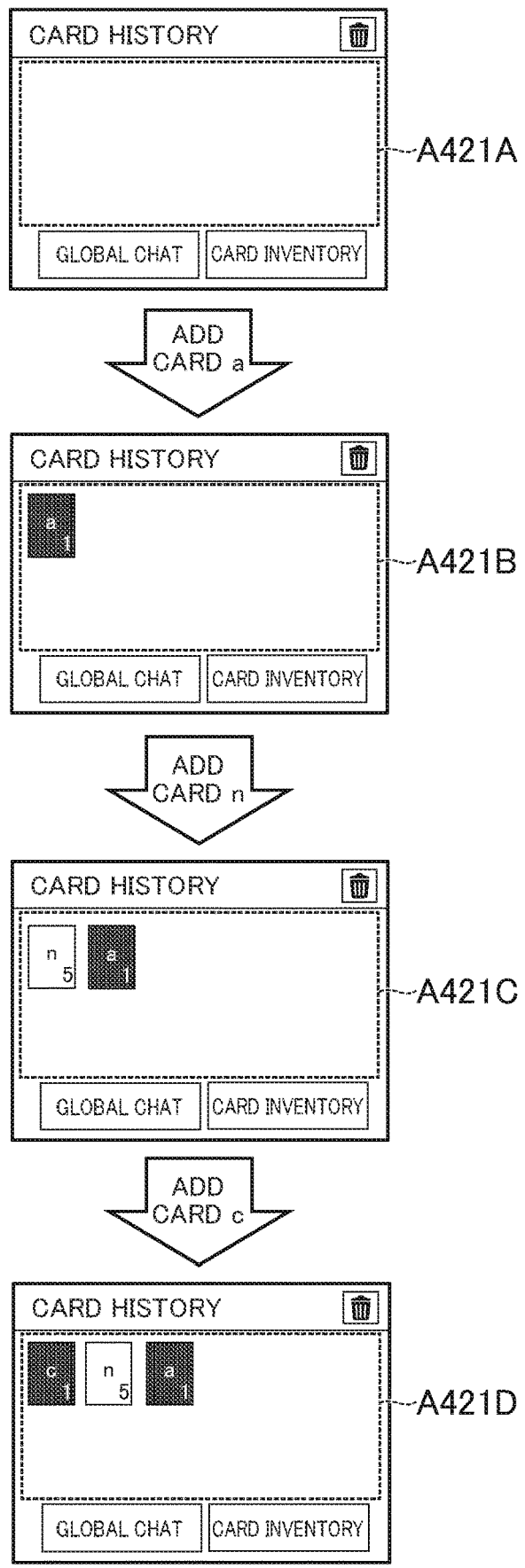
FIG. 8 is a diagram for illustrating changes in a display region when cards are added to the deck one after another.

FIG. 8 is a diagram for illustrating changes in the display region A421 when cards are added to the deck one after another. As illustrated in FIG. 8, for example, from the state in which nothing is displayed in the display region A421 (state indicated by the reference symbol "A421A" of FIG. 8), when the "card a" displayed in the display region A412 is dragged and dropped into the display region A40, the "card a" is added to the deck and is newly displayed in the display region A421 (state indicated by the reference symbol "A421B" of FIG. 8). There is only one "card a" and no more "card a" can be added, and therefore the "card a" is grayed out.

Next, when the "card n" displayed in the display region A412 is dragged and dropped into the display region A40, the "card n" is added to the deck and is newly displayed in addition to the "card a" that is already displayed (state indicated by the reference symbol "A421C" of FIG. 8). In this case, the "card n" is the card that has been added most recently, and therefore the "card n" is displayed first (top left) in the display region A421, and the "card a" is displayed second (on the right side of the "card n").

In addition, when the "card c" displayed in the display region A412 is dragged and dropped into the display region A40, the "card c" is added to the deck and is newly displayed in addition to the "card n" and the "card a" that are already displayed (state indicated by the reference symbol "A421D" of FIG. 8). The "card c" is the card most recently added, and therefore is displayed first (in this case, top left) in the display region A421. The "card n" added before the "card c" is displayed second (on right side of the "card c"), and the "card a" added first is displayed third (on the right side of the "card n"). There is only one "card c" and no more "card c" can be added, and therefore the "card c" is grayed out.

As described above, in the display region A421, each of the plurality of cards added to the deck is arranged in the order of addition. When cards having the same name are repeatedly added, in place of displaying those plurality of cards, only one of those cards is displayed in the display region A42. For example, in the example of FIG. 8, even when three "card n"s are added to the deck one after another, those three "card n"s are not displayed in the display region A421, only one "card n" is displayed.

FIG. 9 is a diagram for illustrating how a card is added to the deck by right-clicking. As illustrated in FIG. 9, for example, when the user places the cursor C on the "card a" displayed in the display region A412 and right-clicks, the "card a" is added to the deck. Of the cards displayed in the display region A41, it is not possible to add the grayed-out cards to the deck. Therefore, even when a grayed-out card is right-clicked, the card is not added to the deck, and the contents of the deck do not change.

As illustrated in FIG. 9, even when a card displayed in the display region A412 is right-clicked and added to the deck, the added card is displayed in the display region A421 in a similar way to that for drag and drop. For example, the point that only one card image is displayed when cards having the same name are repeatedly right-clicked and added to the deck one after another is the same as that for drag and drop. Moreover, for example, the point that, when all of the cards of a possessed number of less than three are added to the deck, the card is grayed out in the display regions A412 and A421, is also the same as that for drag and drop.

In at least one embodiment, a card displayed in the display region A42 is added to the deck not only by performing an operation in the display region A412, but also by performing a predetermined operation in the display region A421.

FIG. 10 is a diagram for illustrating how a card is added to the deck by drag and drop. As illustrated in FIG. 10, for example, when the user places the cursor C on the "card n" displayed in the display region A421 and drags and drops the "card n" to any position in the display region A40, the "card n" is added to the deck. In other words, the "card n" displayed in the display region A421 is added to the deck by dragging and dropping the "card n" so as to straddle the left edge portion of the display region A42 (boundary between the display regions A41 and A42 and the display region A40).

Of the cards displayed in the display region A421, it is not possible to add the grayed-out cards to the deck, and therefore it is not possible to drag and drop the grayed-out cards from the display region A421 to the display region A40. Moreover, even when a card displayed in the display region A421 is dragged and dropped into the display region A41, the card is not added or removed. Similarly, even when a card displayed in the display region A412 is dragged and dropped into the display region A42, the card is not added or removed.

In the example of FIG. 10, even when the "card n" is added to the deck, the "card n" is already displayed in the display region A421, and hence the number of cards displayed in the display region A421 does not increase. Moreover, in at least one embodiment, when a card already displayed in the display region A421 is added to the deck, the display position of each card in the display region A421 does not change. Therefore, even when cards displayed in the display region A421 are repeatedly dragged and dropped into the display region A40 and added to the deck one after another, the display position of the cards in the display region A421 does not change.

FIG. 11 is a diagram for illustrating how a card is added to the deck by right-clicking. As illustrated in FIG. 11, for example, when the user places the cursor C on the "card n" displayed in the display region A421 and right-clicks, the "card n" is added to the deck. Of the cards displayed in the display region A421, it is not possible to add the grayed-out cards to the deck. Therefore, even when a grayed-out card is right-clicked, the card is not added to the deck, and the contents of the deck do not change.

As illustrated in FIG. 11, even when a card displayed in the display region A421 is right-clicked and added to the deck, similarly to the case for drag and drop, the display position of the card in the display region A421 does not change. Therefore, when there are a plurality of cards having the same name, those cards are added to the deck one after another by successively right-clicking the cards in the display region A421 without moving the cursor C.

Next, an operation for removing a card from the deck is described. For example, when the user performs a predetermined operation in the display region A40, a card (card included in the deck) displayed in the display region A40 is removed from the deck. Similarly to the operation for adding a card, drag and drop, and right-clicking are described here as examples of the predetermined operation.

Figure 12:
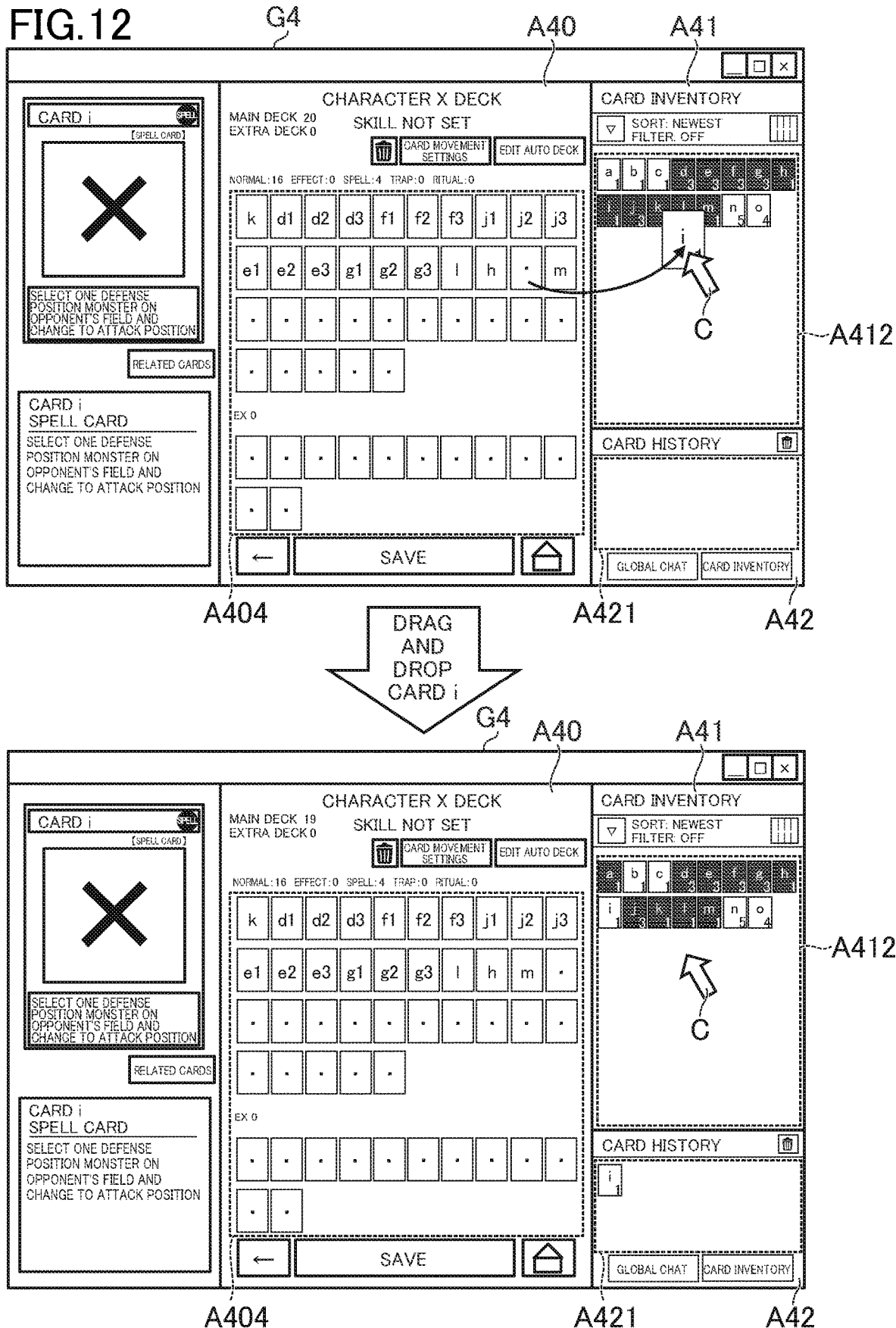
FIG. 12 is a diagram for illustrating how a card is removed from the deck by drag and drop.

FIG. 12 is a diagram for illustrating how a card is removed from the deck by drag and drop. As illustrated in FIG. 12, for example, the "card i" displayed in the display region A404 is removed from the deck by using the cursor C to drag and drop the "card i" into the display regions A41 and A42. In other words, the "card i" displayed in the display region A404 is removed from the deck by dragging and dropping the "card i" so as to straddle the right edge portion of the display region A40 (boundary between the display region A40 and the display regions A41 and A42).

As illustrated in FIG. 12, when the "card i" is removed from the deck, the "card i" can be added to the deck again, and hence the graying out of the "card i" in the display region A412 is released and the card is returned to its original color.

The removed "card i" is displayed in the display region A421. For example, when a plurality of cards having different names from each other are dragged and dropped one after another and removed from the deck, each of the removed plurality of cards is displayed in a line in the display region A421.

Similarly to the case in which a card is added, when cards having the same name are repeatedly removed, only one image of those cards is displayed in the display region A421. That is, even when three cards having the same name are removed, three images of the card are not displayed in the display region A421, only one image of those cards is displayed. Moreover, when a card displayed in the display region A421 is removed, the removed card is not newly displayed in the display region A421, but in at least one embodiment, the display position of the card is changed such that the removed card is conspicuous.

Figure 13:
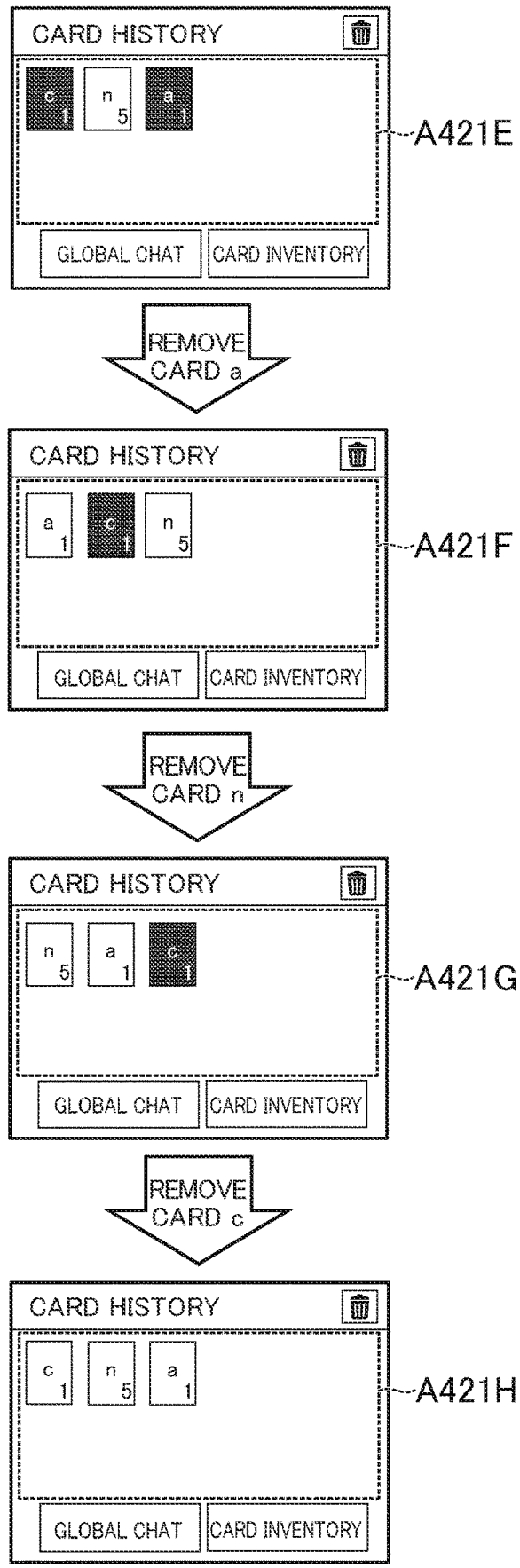
FIG. 13 is a diagram for illustrating changes in a display region when cards are removed from the deck one after another.

FIG. 13 is a diagram for illustrating changes in the display region A421 when cards are removed from the deck one after another. As illustrated in FIG. 13, for example, in the display region A421, when the "card a" is removed from the deck in a state in which the "card c", the "card n", and the "card a" are arranged in order from the first position (top left) (state indicated by the reference symbol "A421E" of FIG. 13), in the display region A421, the "card a" moves to the first position (state indicated by the reference symbol "A421F" of FIG. 13). The "card a" was in a state in which addition was not possible, but as a result of the removal of the "card a", it is now possible to add a card, and therefore the greying-out is released.

Next, when the "card n" is removed from the deck, in the display region A421, the "card n" moves to the first position (state indicated by the reference symbol "A421G" of FIG. 13). Moreover, when the "card c" is removed from the deck, in the display region A421, the "card c" moves to the first position (state indicated by the reference symbol "A421H" of FIG. 13). The "card c" was in a state in which addition was not possible, but as a result of the removal of the "card c", it is now possible to add a card, and therefore the greying-out is released. As described above, in the display region A421, the order of each of the plurality of cards is determined such that the card removed from the deck moves to the first position.

FIG. 14 is a diagram for illustrating how a card is removed from the deck by right-clicking. As illustrated in FIG. 14, for example, when the user right-clicks on the "card i" displayed in the display region A404 by using the cursor C, the "card i" is removed from the deck.

As illustrated in FIG. 14, even when a card displayed in the display region A404 is right-clicked and removed from the deck, the removed card is displayed in the display region A421 in a similar way to that for drag and drop. For example, the point that only one card image is displayed in the display region A421 when cards having the same name are repeatedly right-clicked and removed from the deck one after another is the same as that for drag and drop. Moreover, for example, the point that when a grayed-out card is removed from the deck, the graying-out in the display regions A412 and A421 is released is also the same as that for drag and drop.

As described above, the game system 1 supports deck editing work by displaying the cards added to the deck and the cards removed from the deck in the display region A421 of the deck edit image G4, to thereby reduce the burden on the user. Even when the deck is automatically edited, cards and the like added by the automatic editing may be displayed in the display region A421, but in at least one embodiment, cards and the like added by automatic editing of the deck are not displayed in the display region A421. Details of the configuration of the game system 1 are now described.

3. Functions to be Implemented in Game System

Figure 15:
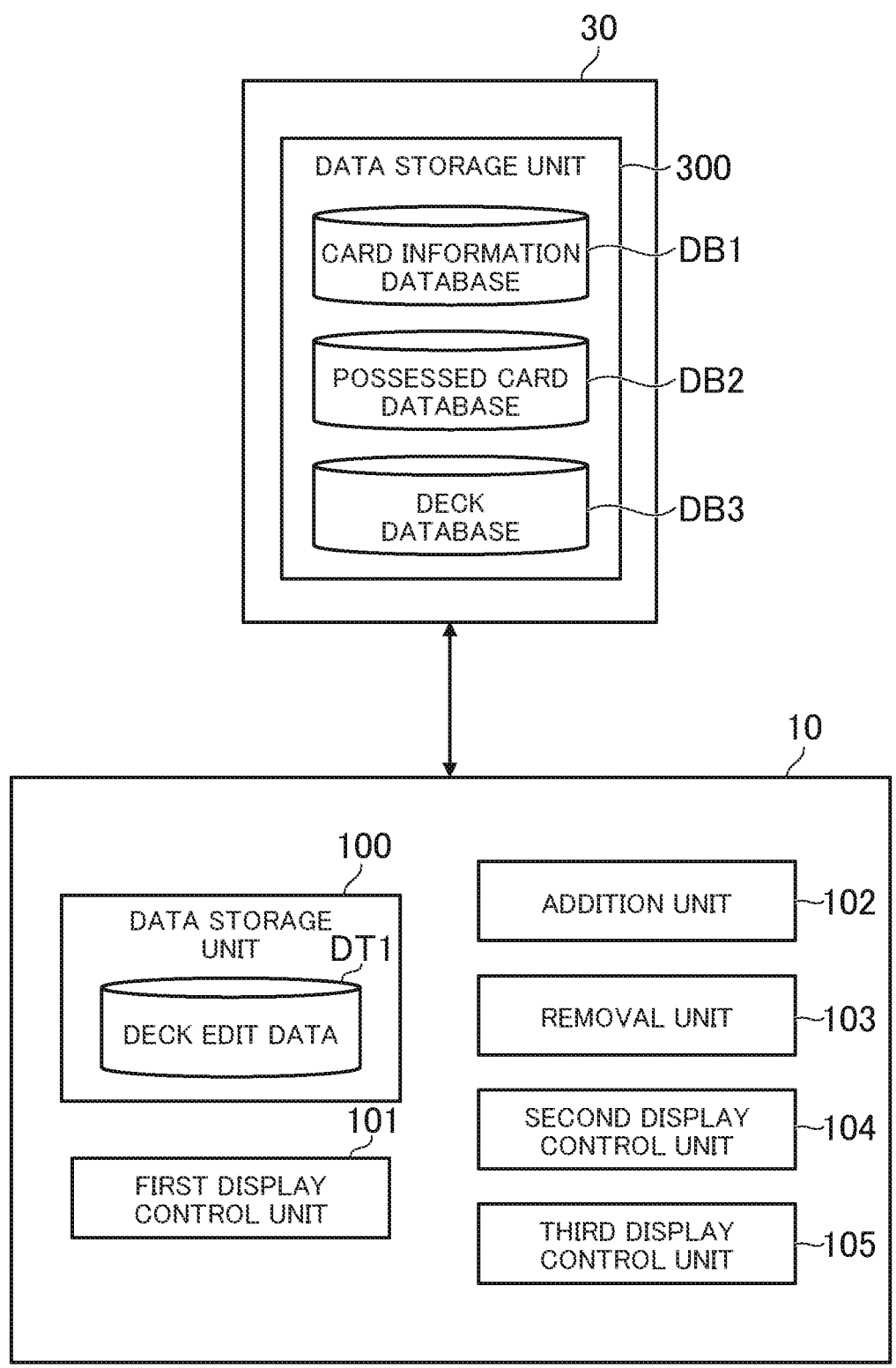
FIG. 15 is a functional block diagram for illustrating functions to be implemented in the game system.

FIG. 15 is a functional block diagram for illustrating functions to be implemented in the game system 1. There is described here functions to be implemented in the server 30 and functions to be implemented in the game terminal 10.

[3-1. Functions to be Implemented in Server]

As illustrated in FIG. 15, a database storage unit 300 is implemented in the server 30. The database storage unit 300 is implemented by at least one of the storage unit 32 and the database DB. The database storage unit 300 is configured to store databases required for executing game processing. As an example of the data stored in the database storage unit 300, there are described here a card information database DB1, a possessed card database DB2, and a deck database DB3.

FIG. 16 is a table for showing a data storage example of the card information database DB1. As shown in FIG. 16, the card information database DB1 is a database relating to cards. For example, the card information database DB1 stores card numbers for uniquely identifying the cards and detailed information on the cards. The detailed information on the cards may be any information on the cards, and may include information such as name, type, level, rarity, attributes, race, offensive power, defensive power, effect description, and monster information. The detailed information may also include an image of the card itself.

FIG. 17 is a table for showing a data storage example of the possessed card database DB2. As shown in FIG. 17, the possessed card database DB2 is a database relating to the cards that each user possesses. For example, the possessed card database DB2 is configured to store user IDs for uniquely identifying the users, the card numbers of the cards possessed by each user, the number of those possessed cards, and serial numbers. The serial numbers are information for uniquely identifying each card possessed by a user. When the user possesses a plurality of cards having the same name, the card number of each of the plurality of cards is the same, but the serial number is different.

FIG. 18 is a table for showing a data storage example of the deck database DB3. As shown in FIG. 18, the deck database DB3 is a database relating to the deck of each user. For example, the deck database DB3 includes user IDs, the names of the characters that can be used by each user, deck IDs for uniquely identifying the deck of each user, lock information on whether or not there is a lock, and deck contents information on the contents of the deck. For example, the value of the lock information is changed by the user selecting the button B340 of the deck contents image G3. The deck contents information may be any information allowing the contents of the deck to be identified, and for example, a combination of the name of the deck with the card number and serial number of the cards included in the deck is stored.

The data stored in the database storage unit 300 is not limited to the above-mentioned examples. For example, the database storage unit 300 may store a database showing basic information on the user, such as a user ID and a user name. Moreover, for example, the database storage unit 300 may store image data for displaying the mode selection image G1, the deck selection image G2, the deck contents image G3, and the deck edit image G4.

[3-2. Functions to be Implemented in Game Terminal]

As illustrated in FIG. 15, in the game terminal 10, a data storage unit 100, a first display control unit 101, an addition unit 102, a removal unit 103, a second display control unit 104, and a third display control unit 105 are implemented.

[3-2-1. Data Storage Unit]

The data storage unit 100 is implemented mainly by the storage unit 12. The data storage unit 100 is configured to store the data required for executing game processing. Here, as an example of the data stored in the data storage unit 100, deck edit data DT1 is described.

FIG. 19 is a table for showing a data storage example of the deck edit data DT1. As shown in FIG. 19, the deck edit data DT1 is data relating to deck editing, and is data for displaying the deck edit image G4. For example, the deck edit data DT1 stores a deck ID of the deck being edited, possessed card information on the possessed cards, deck contents information on the contents of the deck being edited, and display information on the display contents of the display region A421.

The possessed card information is, of the possessed card database DB2, the contents of a record corresponding to the user of the game terminal 10. For example, the possessed card information stores a card number, the number of possessed cards, and a serial number. The display contents of the display region A412 are determined based on the possessed card information. Therefore, the possessed card information is information for displaying the cards in the display region A412.

The deck contents information is information for identifying the cards incorporated in the deck being edited. For example, the deck contents information stores a deck name, a card number, and a serial number. The display contents of the display region A400 become the name of the deck stored in the deck contents information. The display contents of the display region A404 are determined based on the card number and the serial number stored in the deck contents information. Therefore, the deck contents information is information for determining the display contents of the display region A40.

The display information is information for displaying the cards in the display region A421. For example, the display information stores the order of each card, a card number, and a serial number. In the display region A421, the cards identified by the card numbers and serial numbers stored in the display information are displayed in a line based on the order stored in the display information. When the button B420 is selected, the display information is reset. Moreover, the display information may be reset each time deck editing is finished, or the contents of the display information may be maintained until the game program is finished.

The data stored in the data storage unit 100 is not limited to the above-mentioned examples. For example, the data storage unit 100 may store, of the databases stored in the database storage unit 300 of the server 30, the data relevant to the user of the game terminal 10. For example, the data storage unit 100 may store, of the records stored in the possessed card database DB2, the contents of the record corresponding to the user of the game terminal 10. As another example, the data storage unit 100 may store, of the records stored in the deck database DB3, the contents of the record corresponding to the user of the game terminal 10. As another example, the data storage unit 100 may store the card information database DB1.

[3-2-2. First Display Control Unit]

The first display control unit 101 is implemented mainly by the control unit 11. The first display control unit 101 is configured to display first card information on each of the plurality of cards included in the deck on the display unit 15.

The first card information is, for example, information for identifying the cards included in the deck. For example, the first card information is an image (including an icon), a name, an ID, and the like of each card included in the deck. The name or ID indicated by the first card information may be represented by, for example, a combination of letters and symbols. Moreover, for example, the first card information may be a list of the cards included in the deck. The first card information, such as the image, name, and ID of each card, may be arranged and displayed in the list.

In at least one embodiment, the name of each card in the display region A404 corresponds to the first card information. In the example of FIG. 5, the name of each card displayed in the display region A404, such as "k", "d1", "d2", and "d3", corresponds to the first card information. Therefore, in at least one embodiment, the expression "name of each card in the display region A404" can be read as "first card information". The data for displaying the first card information is stored in the database storage unit 300 or the data storage unit 100, and the first display control unit 101 displays the first card information based on the data.

Moreover, for example, the first display control unit 101 may display the first card information outside a specific region.

The specific region is, for example, a part of the screen. For example, the specific region is a region defined on the screen as a region for displaying second card information described later. Moreover, for example, the specific region is a region different from the region for displaying the first card information. However, the specific region may partially overlap with the region for displaying the first card information. Moreover, for example, the specific region may be a region closer to an edge portion of the screen than the region for displaying the first card information, or may be a region narrower than the region for displaying the first card information.

In at least one embodiment, the display region A412 corresponds to the specific region. Therefore, in at least one embodiment, the term "display region A412" can be read as "specific region". Moreover, the display region A404 corresponds to "outside the specific region. Therefore, in at least one embodiment, the term "display region A404" can be read as "outside the specific region".

[3-2-3. Addition Unit]

The addition unit 102 is implemented mainly by the control unit 11. The addition unit 102 is configured to add a selected card to the deck.

The selected card may be, for example, a card selected by the user, or a card automatically selected by a computer (CPU). The term "automatic" means, for example, that a computer selects a card based on a predetermined rule even when the user does not select a card. In other words, "automatic" means selecting at least one card by, for example, a computer executing a program in which a predetermined rule is described.

For example, when the user selects a card, the user can specify any card he or she wants to add to the deck. Moreover, for example, when the computer automatically selects a card, the card to be added to the deck can be determined without the user selecting an individual card, which enables the burden on the user to be effectively reduced. Moreover, for a user who does not know which card to add, for example, a beginner user, the computer can support game play by selecting a recommended card.

Moreover, for example, the selected card is a card to be added to the deck. For example, the selected card is a card selected as a card to be added to the deck from among the cards possessed by the user. The card may be selected from within the deck, or the card may be selected from outside the deck. That is, the card may be added by selecting a card that is already incorporated in the deck, or the card may be added by selecting a card that is not incorporated in the deck.

For example, the addition unit 102 adds a card to the deck by updating at least one of the deck database DB3 and the deck edit data DT1 such that the deck ID is associated with the card number and serial number of the selected card. The term "associate" means storing information in the same record.

Moreover, for example, when a card displayed as the second card information described later is selected, the addition unit 102 may add the selected card to the deck. As described later, in at least one embodiment, the name of the card displayed in the display region A421 corresponds to the second card information. Therefore, when a card whose name is displayed in the display region A421 is selected, the addition unit 102 adds the selected card to the deck.

In at least one embodiment, drag and drop and right-click are described as the operation for adding a card, but any operation can be used for that operation. For example, the card to be added may be selected by an operation such as a tap, a double tap, a long press, a flick, or a swipe. Further, the card to be added may be selected by pressing a predetermined button of the operation unit 14, or the card to be added may be selected by a voice input of the user.

[3-2-4. Removal Unit]

The removal unit 103 is implemented mainly by the control unit 11. The removal unit 103 is configured to remove a selected card from the deck.

The meaning of "selected card" is as described in relation to the addition unit 102, but in this case, the selected card means a card to be removed from the deck. For example, when the user selects a card, the user specifies a given card that he or she wants to remove from the deck. Moreover, for example, when a computer automatically selects the card, the card to be removed from the deck can be determined without the user having to individually select the card, which enables the burden on the user to be effectively reduced. Moreover, for a user who does not know which card to remove, for example, a beginner user, the computer can support game play by selecting a unrequired card.

Moreover, for example, the selected card is a card selected from among the cards included in the deck as a card to be removed from the deck. The card may be selected from within the deck, or the card may be selected from outside the deck. That is, the card may be removed by selecting a card that is already incorporated in the deck, or the card may be removed by selecting a card that is not incorporated in the deck.

For example, the removal unit 103 removes a card from the deck by updating at least one of the deck database DB3 and the deck edit data DT1 such that the association between the deck ID and the card number and serial number of the selected card is released. The expression "releasing the association" means a state in which information is not stored in the same record. In this case, the card number and serial number associated with the deck ID are deleted.

Moreover, for example, even when a card displayed as the second card information is selected, the removal unit 103 may not remove the card from the deck. As described later, in at least one embodiment, the name of the card displayed in the display region A421 corresponds to the second card information. Therefore, even when a card whose name is displayed in the display region A421 has been selected, the removal unit 103 does not remove the selected card from the deck.

In at least one embodiment, drag and drop and right-click are described as the operation for removing a card, but any operation can be used for that operation. For example, the card to be removed may be selected by an operation such as a tap, a double tap, a long press, a flick, or a swipe. Further, the card to be removed may be selected by pressing a predetermined button of the operation unit 14, or the card to be removed may be selected by a voice input of the user.

[3-2-5. Second Display Control Unit]

The second display control unit 104 is implemented mainly by the control unit 11. The second display control unit 104 is configured to display on the display unit 15 the second card information for identifying the card added to the deck.

The second card information is, for example, information on all or a part of the cards added in the past. When the second card information is information on a part of the cards, the cards may be a card added in a most recent predetermined period or may be a predetermined number of cards added most recently. For example, the second card information is a list of the cards selected for addition. Moreover, for example, the second card information is information on all or a part of the cards removed in the past. When the second card information is information on a part of the cards, the cards may be a card removed in a most recent predetermined period, or may be a predetermined number of cards removed most recently. For example, the second card information is a list of the cards selected for removal.

For example, the second card information may not be displayed in time series. Moreover, for example, the second card information is information on at least one combination of the added cards and the removed cards. Moreover, for example, the second card information is information on a history of at least one of the added cards and the removed cards. Moreover, for example, the second card information is a list of information on the image, name, ID, and the like of cards that have been added or removed. Moreover, for example, the second card information is displayed in a specific region on the screen. Moreover, for example, when there are no added or removed cards, nothing is displayed for the second card information. For example, every time a card is added or removed, the image, name, ID, and the like of the card are displayed as the second card information. For example, when the card selected for addition or removal is not in the second card information, the information on that card is newly added to the second card information.

In at least one embodiment, the name of each card in the display region A421 corresponds to the second card information. In the example of FIG. 8, the name of each card displayed in the display region A421, such as "c", "n", and "a", corresponds to the second card information. Therefore, in at least one embodiment, the expression "name of each card in the display region A421" can be read as "second card information". The data for displaying the second card information is stored in the database storage unit 300 or the data storage unit 100, and the second display control unit 104 displays the second card information based on the data.

In at least one embodiment, the second card information includes information for identifying a card added to the deck and information for identifying a card removed from the deck. That is, the second card information may be information for identifying a card added to the deck, or may be information for identifying a card removed from the deck.

For example, the second display control unit 104 displays the second card information in the specific region of the display unit 15. The meaning of "specific region" is as described above. In at least one embodiment, the display region A421 corresponds to the specific region, and therefore the second display control unit 104 displays the second card information in the display region A421.

For example, when a card is selected, the second display control unit 104 displays on the display unit 15 the second card information for identifying the card. The expression "when a card is selected" refers to, for example, the timing at which the card is added to the deck. Moreover, for example, this is the timing at which the card is selected to be added to the deck. Moreover, for example, "when a card is selected" may refer to the timing in both cases described above. In at least one embodiment, when a card has been added or removed by drag and drop, the second display control unit 104 displays the second card information for identifying the card in the display region A421.

Moreover, for example, the first card information and the second card information may be displayed in the same screen. The term "in the same screen" refers to a state in which the user can visually recognize the information without requiring scrolling or a screen transition, for example. In at least one embodiment, the second display control unit 104 displays on the display unit 15 the deck edit image G4 including the display region A404 for displaying the first card information and the display region A421 for displaying the second card information.

Moreover, for example, the second display control unit 104 determines the display position of the cards displayed as the second card information based on the order in which the cards are added to the deck.

The display position is, for example, a position in the display region of the second card information. For example, when information on n cards (n is an integer of 2 or more) is displayed in the second card information, an order from a first to an n-th card is given to each card. For example, the display position of each card is displayed in accordance with the order set for that card. The order can also be called a display priority. For example, the information on the first card is displayed at a predetermined position in the display region, and the information on the cards is sequentially arranged in any of a vertical direction and a horizontal direction. For example, in a case where cards have been added to the deck one after another when there is nothing in the second card information, in the second card information, the cards are displayed in time series in a line from the card added most recently to the card added first. The relationship between the order and the display position may be determined in advance in the data storage unit 100.

The cards displayed as the second card information are, for example, the cards shown in the second card information. In at least one embodiment, the names of the card correspond to the second card information, and the cards whose names are displayed in the display region A421 correspond to the cards displayed as the second card information. For this reason, in at least one embodiment, the expression "cards whose names are displayed in the display region A421 can be read as "cards displayed as the second card information".

In at least one embodiment, the second display control unit 104 displays the second card information on each card in the display region A421 such that the cards are arranged in the order in which the cards are added or removed. For example, the second display control unit 104 arranges and displays the second card information in order by displaying the second card information on the first card at a predetermined position (for example, upper left) in the display region A421, and then displaying in a predetermined direction (for example, rightward) from that position the second card information on the second card, the third card, the fourth card, and so on.

For example, the second display control unit 104 may determine the display mode of the card displayed as the second card information based on related information associated with the card displayed as the second card information.

A card displayed as the second card information is, for example, a card already displayed as the second card information, and may be a card added or removed most recently, or a card added or removed earlier than that. In at least one embodiment, a card whose name is displayed in the display region A421 corresponds to a card displayed as the second card information.

The related information is, for example, accompanying information that accompanies the card. For example, the related information is information that changes after the card is given to the user. Moreover, for example, the related information may be an ability parameter such as the offensive power or defensive power of the card, or may be a skill parameter indicating a special effect. Moreover, for example, the related information may be user information associated with the card. The user information is content in which a setting of each user is reflected in the card. For example, of the information on the card, the user information is not information unique to the card, but is information that changes in accordance with the user. For example, the user information is the possessed number of the cards, whether or not the card is a favorite, or a name given by the user to the card. For example, the number of possessed cards may correspond to the related information, or the number of cards incorporated in the deck may correspond to the related information.

The display mode is a mode relating to visual appearance, and is, for example, a color, a size, a shape such as a font, a brightness, a degree of transparency, or an effect such as blinking or rotation. The term "grayed out" in at least one embodiment corresponds to a change in the display mode.

For example, the second display control unit 104 may determine the display mode of a card displayed as the second card information based on the possessed number associated with the card displayed as the second card information. For example, the second display control unit 104 determines the numerical value to be displayed at the lower right of the name of the card based on the possessed number of the cards. Moreover, for example, the second display control unit 104 grays out the card displayed as the second card information when the possessed number of that card is a predetermined number (for example, three cards) or less and all of those possessed cards have been incorporated in the deck.

Further, for example, the second display control unit 104 may determine the display mode of the card displayed as the second card information based on the number of cards displayed as the second card information that are incorporated in the deck. For example, the second display control unit 104 grays out a card when the possessed number of the card is a predetermined number (for example, three cards) or less and all of those have been incorporated in the deck. The condition for the card to be grayed out is not limited to the example described above, and any condition may be used. For example, regardless of the total number of the cards, the card may be grayed out when no more cards can be added to the deck.

For example, when a card not displayed in the second card information is added to the deck, the second display control unit 104 may display the second card information for identifying the added card at a predetermined position.

The predetermined position is the position at which the card having the highest display order is to be displayed. The predetermined position is a position in the display region of the second card information. For example, the predetermined position may be at any one of the top, bottom, left, and right of the display region, or may be at any one of the upper left, the upper right, the lower left, and the lower right. In at least one embodiment, the upper left of the display region A421 (position at which the first card is displayed) corresponds to the predetermined position. Therefore, in at least one embodiment, the expression "upper left of the display region A421" can be read as the "predetermined position".

Further, for example, the second display control unit 104 may be configured such that when a card displayed as the second card information is added to the deck, the display relating to the second card information is not updated. The display relating to the second card information is, for example, at least one of the display position and the display mode of the second card information. For example, the second display control unit 104 does not update the arrangement order of the cards in the display region A421 when a card already displayed in the display region A421 is added to the deck.

Further, for example, when a card is removed from the deck, the second display control unit 104 may display the second card information for identifying the removed card at the predetermined position. The meaning of "predetermined position" is as described above. The second display control unit 104 displays the card removed from the deck at the predetermined position regardless of whether or not the card is displayed in the display region A421.

[3-2-6. Third Display Control Unit]

The third display control unit 105 is implemented mainly by the control unit 11. The third display control unit 105 is configured to display third card information on a card that the user possesses or a card not included in the deck.

As used herein, the term "possess" means, for example, that the user ID and the card ID are associated with each other. That is, the user has acquired the card, and the card can be used. The third card information is, for example, a list of information such as the image, the name, and the ID of each of the cards possessed by the user. Moreover, for example, the third card information may be a list of information such as the image, the name, and the ID of cards not included in the deck. The expression "cards not included in the deck" refers to, for example, cards that can be added to the deck.

In at least one embodiment, the name of each card in the display region A412 corresponds to the third card information. In the example of FIG. 5, the name of each card displayed in the display region A412, such as "a", "b", and "c", corresponds to the third card information. Therefore, in at least one embodiment, the expression "name of each card in the display region A412" can be read as "third card information". The data for displaying the third card information is stored in the database storage unit 300 or the data storage unit 100, and the third display control unit 105 displays the third card information based on the data.

For example, the first card information, the second card information, and the third card information may be displayed in the same screen. The meaning of "same screen" is as described above. In at least one embodiment, the third display control unit 105 displays on the display unit 15 a deck edit image G4 including the display region A404 for displaying the first card information, the display region A421 for displaying the second card information, and the display region A412 for displaying the third card information.

4. Processing to be Executed in Game System

Figure 20:
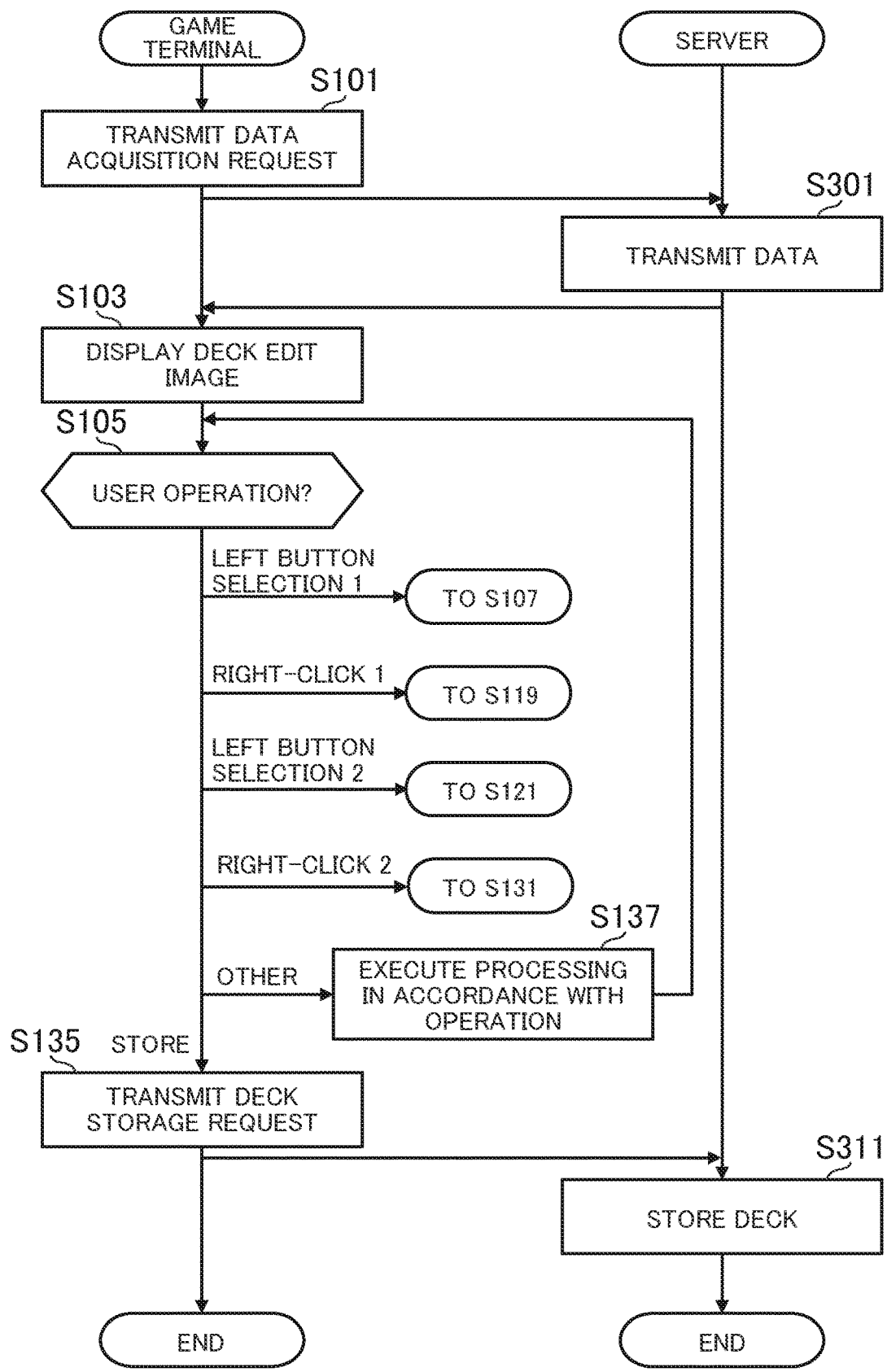
FIG. 20 is a flowchart for illustrating an example of processing to be executed in the game system.
Figure 21:
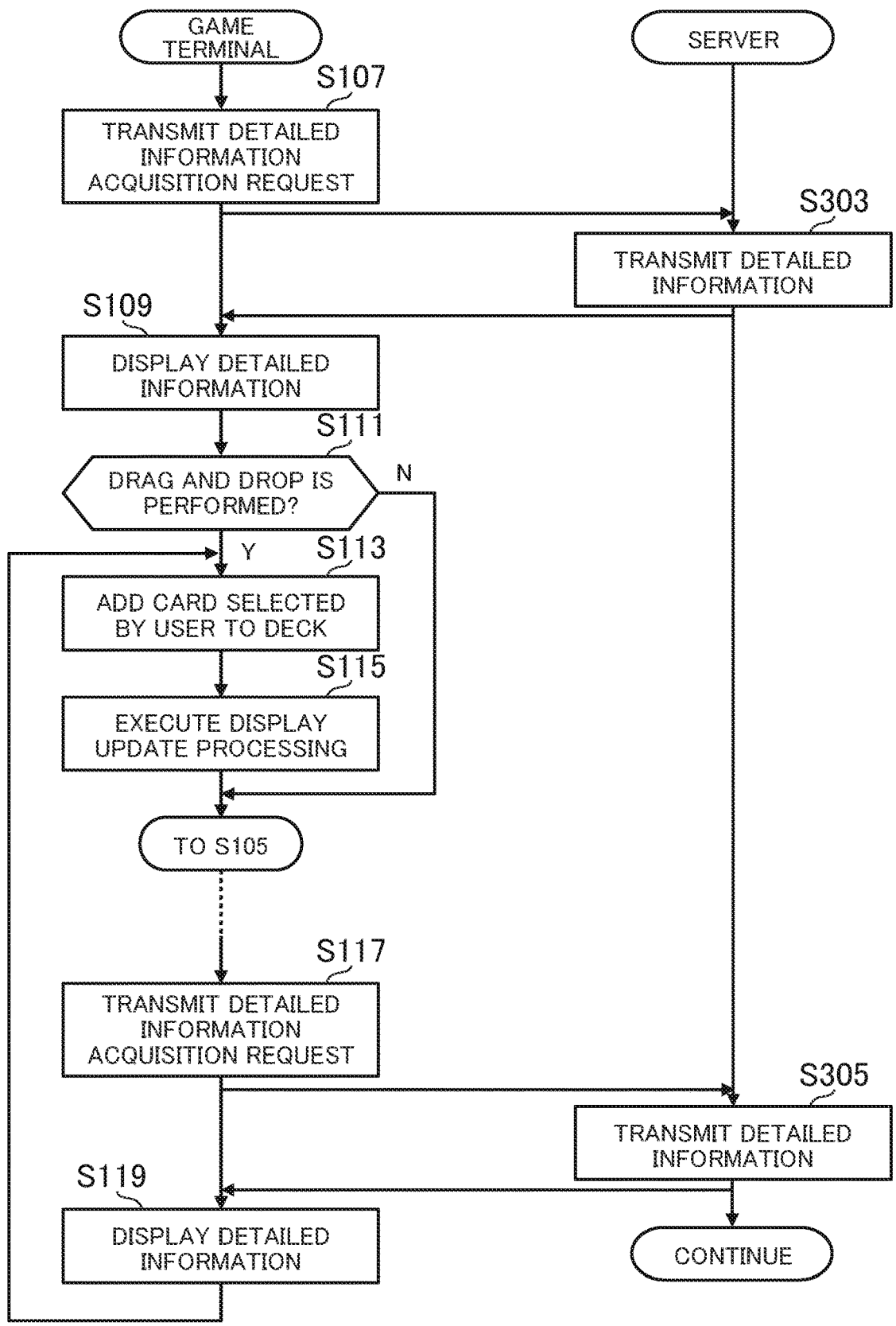
FIG. 21 is a flowchart for illustrating an example of processing to be executed in the game system.
Figure 22:
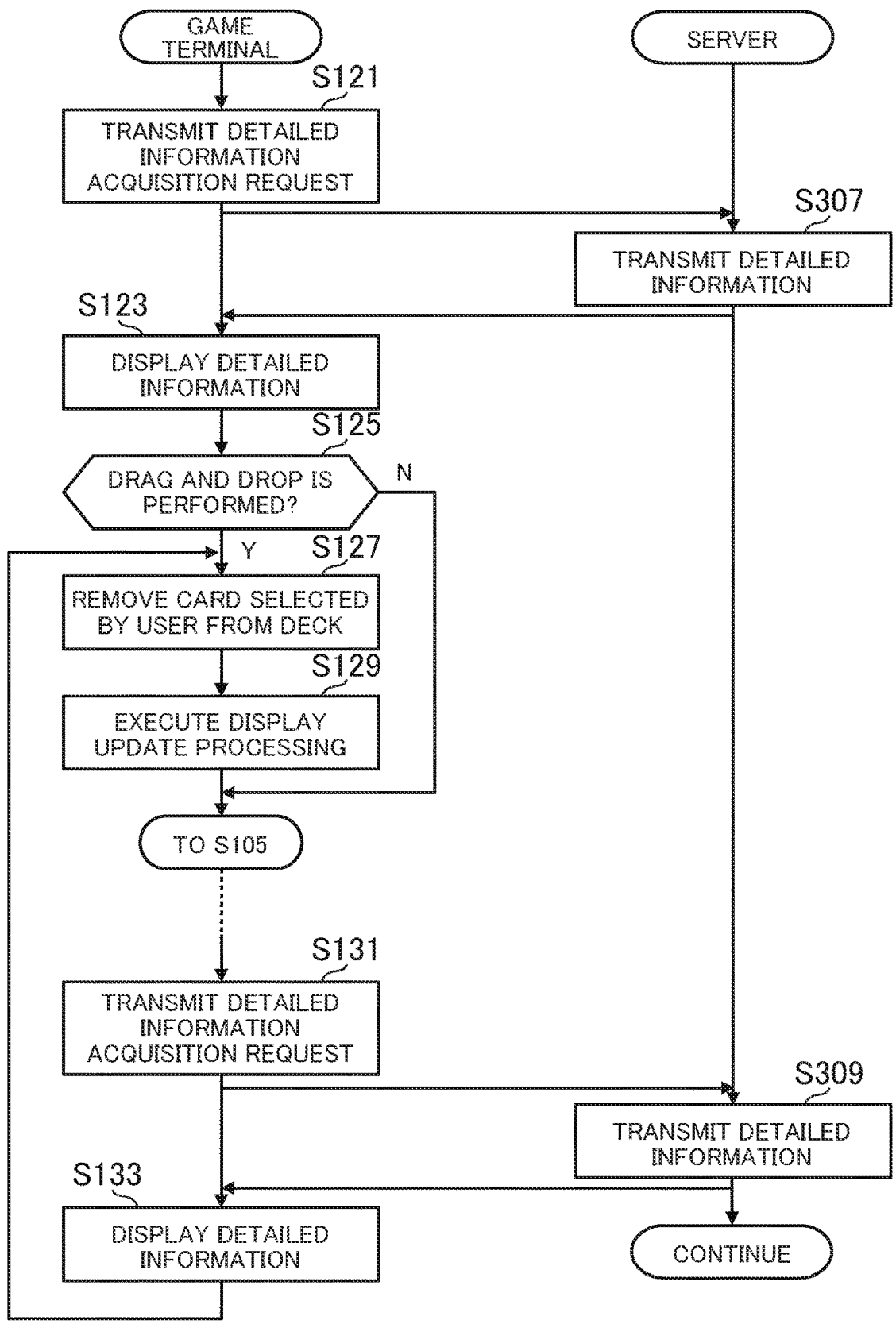
FIG. 22 is a flowchart for illustrating an example of processing to be executed in the game system.

FIG. 20 to FIG. 22 are flowcharts for illustrating examples of processing to be executed in the game system 1. For example, the processing illustrated in FIG. 20 to FIG. 22 is executed by the control unit 11 executing programs stored in the storage unit 12 and the control unit 31 executing programs stored in the storage unit 32. The processing illustrated in FIG. 20 to FIG. 22 is an example of the processing to be executed by the functional blocks illustrated in FIG. 15. In this example, there is described processing to be executed when the deck edit image G4 is displayed. The processing described below is executed when the button B34 of the deck contents image G3 is selected.

As illustrated in FIG. 20, first, in the game terminal 10, the control unit 11 transmits to the server 30 a request for acquiring the data required for displaying the deck edit image G4 (Step S101). Here, as an example of the data required for displaying the deck edit image G4, the data relating to the cards included in the deck to be edited (the deck displayed when the button B34 of the deck contents image G3 is selected) and the data relating to the cards possessed by the user are described. Therefore, the acquisition request transmitted in Step S101 includes the deck ID of the deck to be edited. The deck ID is stored in the storage unit 12 in advance. Moreover, when some kind of information is transmitted from the game terminal 10 to the server 30, the user ID is transmitted together with that information.

When the server 30 receives the data acquisition request, the control unit 31 transmits the data required for displaying the deck edit image G4 to the game terminal 10 based on the card information database DB1, the possessed card database DB2, and the deck database DB3 (Step S301). In Step S301, the control unit 31 refers to the possessed card database DB2, and acquires the card number, the number of possessed cards, and the serial number of the record in which the user ID included in the acquisition request is stored. Moreover, the control unit 31 refers to the card information database DB1, and acquires the image of the record in which that card number and serial number are stored. In addition, the control unit 31 refers to the deck database DB3, and acquires the deck contents information in the record in which the user ID and the deck ID included in the acquisition request are stored. The control unit 31 transmits the acquired information.

When the game terminal 10 receives the data, the control unit 11 displays the deck edit image G4 based on the received data (Step S103). In Step S103, the control unit 11 generates deck edit data DT1 based on the received data, and records the generated deck edit data DT1 in the storage unit 12. The deck edit image G4 displayed in Step S103 is in the state illustrated in FIG. 5, and no cards are displayed in the display region A421. Moreover, at least one of the game terminal 10 and the server 30 may retain the display state of the display region A421 as of the time of the previous deck edit, and then transition to the previous display state of the display region A421 at the time of Step S103.

The control unit 11 identifies a user operation based on a detection signal of the operation unit 14 (Step S105). In this case, it is assumed that any one of the following operations is performed, that is, an "operation of pressing the left mouse button to select a card displayed in the display regions A412 and A421", an "operation of right-clicking with the mouse a card displayed in the display regions A412 and A421", an "operation of pressing the left mouse button to select a card displayed in the display region A404", an "operation of right-clicking with the mouse a card displayed in the display region A404", an "operation of left-clicking with the mouse the button B45", or "other operation".

When the left button of the mouse is pressed to select a card displayed in the display regions A412 and A421 (Step S105: left button selection 1), the processing advances to FIG. 21, and the control unit 11 transmits to the server 30 a request for acquiring the detailed information on the card selected by the user (Step S107). In Step S107, the control unit 11 identifies, based on the deck edit data DT1, the card number and serial number of the card selected by the user, and transmits an acquisition request including the identified card number and serial number. When the card selected with the left button is grayed out, the processing after Step S107 is not executed, and the processing returns to Step S105.

When the server 30 receives the detailed information acquisition request, the control unit 31 transmits the detailed information on the card selected by the user to the game terminal 10 based on the card information database DB1 (Step S303). In Step S303, the control unit 31 identifies the record in the card information database DB1 in which the card number and serial number included in the acquisition request are stored, and transmits the detailed information included in the identified record.

When the game terminal 10 receives the detailed information on the card, the control unit 11 displays the received detailed information in the display region A43 (Step S109). In Step S109, the control unit 11 displays the received image in the display region A430, and displays the card name, type, and description in the display region A432.

The control unit 11 determines, based on a detection signal of the operation unit 14, whether or not the card selected by the user has been dragged and dropped into the display region A40 (Step S111). In Step S111, the control unit 11 determines whether or not the position of the cursor C is in the display region A40 when the pressing of the left button of the mouse is released.

When it is not determined that the card has been dragged and dropped (Step S111: N), the processing returns to Step S105. In this case, the pressing of the left mouse button has been released without the card selected by the user being dragged and dropped into the display region A40, and therefore the card is not added to the deck.

Meanwhile, when it is determined that the card has been dragged and dropped (Step S111: Y), the control unit 11 adds the card selected by the user (the dragged and dropped card) to the deck (Step S113). In Step S113, the control unit 11 stores the card number and serial number of the card selected by the user in the deck edit data DT1 in association with the deck ID.

The control unit 11 executes the display update processing for a case in which a card has been added to the deck (Step S115). The display update processing is processing for updating the display of the deck edit image G4.

Figure 23:
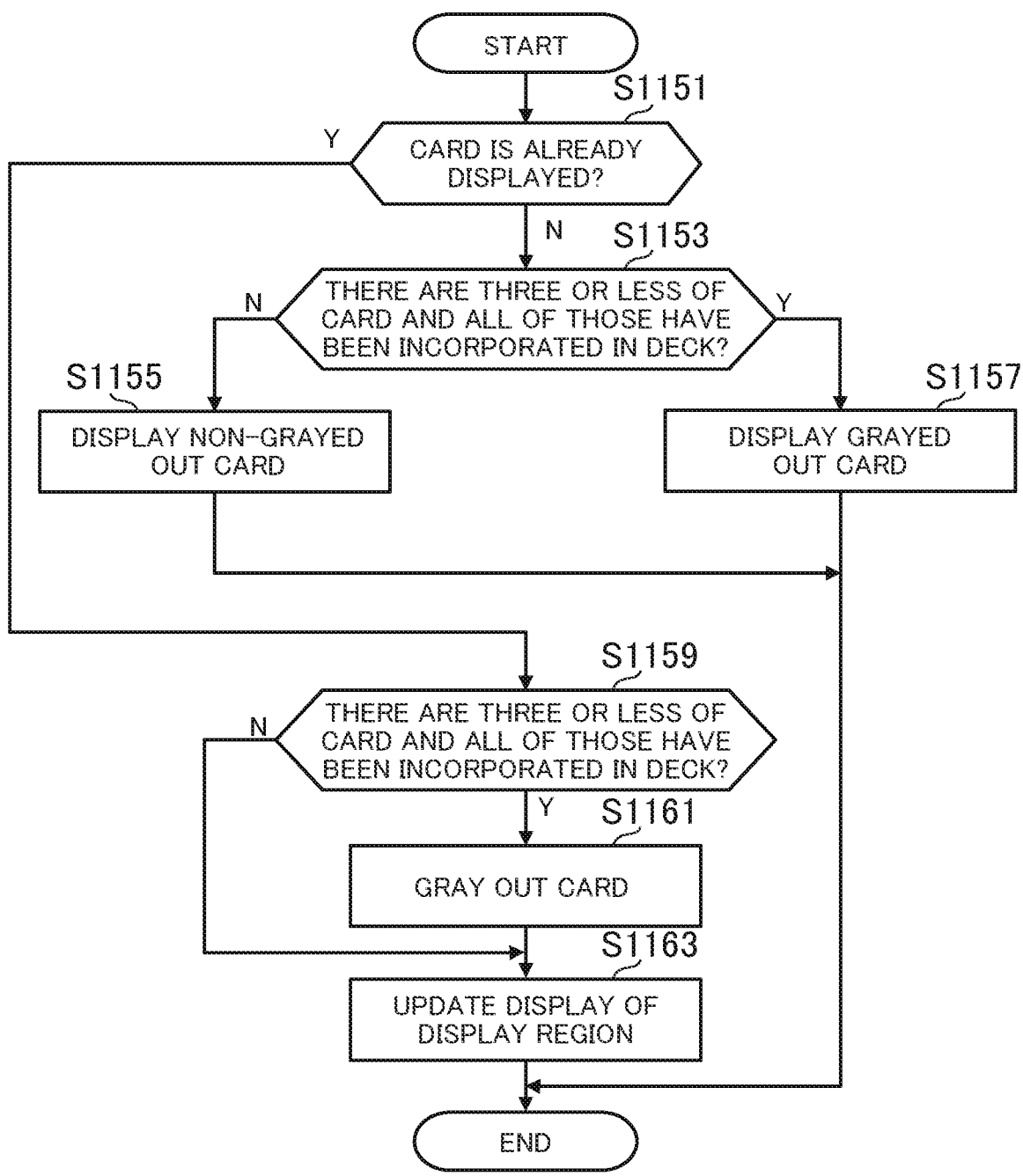
FIG. 23 is a flowchart for illustrating details of display update processing for a case in which a card has been added to the deck.

FIG. 23 is a flowchart for illustrating details of the display update processing for the case in which a card has been added to the deck. As illustrated in FIG. 23, the control unit 11 determines whether or not the card added to the deck is already displayed in the display region A421 based on the deck edit data DT1 (Step S1151). In Step S1151, the control unit 11 refers to the display information in the deck edit data DT1, and determines whether or not the card number and serial number of the card added to the deck are stored as a display target in the display region A421.

When it is determined that the card added to the deck is not displayed in the display region A421 (Step S1151: N), the control unit 11 determines whether or not there are three or less of that card and whether or not all of those have been incorporated in the deck (Step S1153). In Step S1153, the control unit 11 determines whether or not there are three or less of the card by identifying how many of the card there are based on the possessed card information in the deck edit data DT1, and determines whether or not all of those have been incorporated in the deck based on the deck contents information in the deck edit data DT1.

When it is not determined that there are three or less of the card and that all of those have been incorporated in the deck (Step S1153: N), the control unit 11 displays a normal card that is not grayed out in the display region A421 (Step S1155). In Step S1155, the control unit 11 updates the display information in the deck edit data DT1 such that the added card is displayed first. Information on whether or not the card is grayed out may be held in the deck edit data DT1. This point is the same in the following description as well.

Meanwhile, when it is determined that there are three or less of the card and that all of those have been incorporated in the deck (Step S1153: Y), the control unit 11 displays a grayed-out card in the display region A421 and also grays out the card in the display region A412 (Step S1157). In Step S1157, the control unit 11 updates the display information of the deck edit data DT1 such that the added card is displayed first.

Meanwhile, when it is determined in Step S1151 that the card added to the deck is already displayed in the display region A421 (Step S1151: Y), the control unit 11 determines whether or not there are three or less of that card and whether or not all of those have been incorporated in the deck (Step S1159). The processing of Step S1159 is the same as the processing of Step S1153.

When it is determined that there are three or less of the card and that all of those have been incorporated in the deck (Step S1159: Y), the control unit 11 grays out the card in the display regions A412 and A421 (Step S1161). In Step S1161, the control unit 11 updates the display information in the deck edit data DT1.

The control unit 11 updates the display of the display region A40 (Step S1163), and the display update processing ends. In Step S1163, the control unit 11 displays the card added in Step S113 in the display region A404, and changes the number of the cards in the display region A401 and the display region A403.

In Step S105 of FIG. 20, when the card displayed in the display regions A412 and A421 is right-clicked with the mouse (Step S105: right-click 1), the processing advances to FIG. 21, and the control unit 11 transmits to the server 30 a request for acquiring the detailed information on the card selected by the user (Step S117). The processing of Step S117 is the same as the processing of Step S107. When the card selected by right-clicking is grayed out, the processing after Step S117 is not executed.

The processing of the subsequent Steps S305 and S119 is the same as the processing of Steps S303 and S109, respectively. In Step S119, when the detailed information on the right-clicked card is displayed in the display region A43, the processing advances to Step S113, the right-clicked card is added to the deck, and in Step S115, display update processing of the added card is executed.

In Step S105 of FIG. 20, when the left mouse button is pressed to select a card displayed in the display region A404 (Step S105: left button selection 2), the processing advances to FIG. 22, and the control unit 11 transmits to the server 30 a request for acquiring the detailed information on the card selected by the user (Step S121). The processing of Step S121 is the same as the processing of Step S107. The processing of the subsequent Steps S307 and S123 is the same as the processing of Steps S303 and S109, respectively.

The control unit 11 determines, based on a detection signal of the operation unit 14, whether or not the card selected by the user has been dragged and dropped into the display regions A41 and A42 (Step S125). In Step S125, the control unit 11 determines whether or not the position of the cursor C is in the display regions A41 and A42 when the pressing of the left button of the mouse is released.

When it is not determined that the card has been dragged and dropped (Step S125: N), the processing returns to Step S105. In this case, the pressing of the left mouse button has been released without the card selected by the user being dragged and dropped into the display regions A41 and A42, and therefore the card is not removed from the deck.

Meanwhile, when it is determined that the card has been dragged and dropped (Step S125: Y), the control unit 11 removes the card selected by the user (the dragged and dropped card) from the deck (Step S127). In Step S127, the control unit 11 deletes the card number and serial number of the card selected by the user associated with the deck ID from the deck edit data DT1. The control unit 11 executes the display update processing for a case in which a card has been removed from the deck (Step S129).

Figure 24:
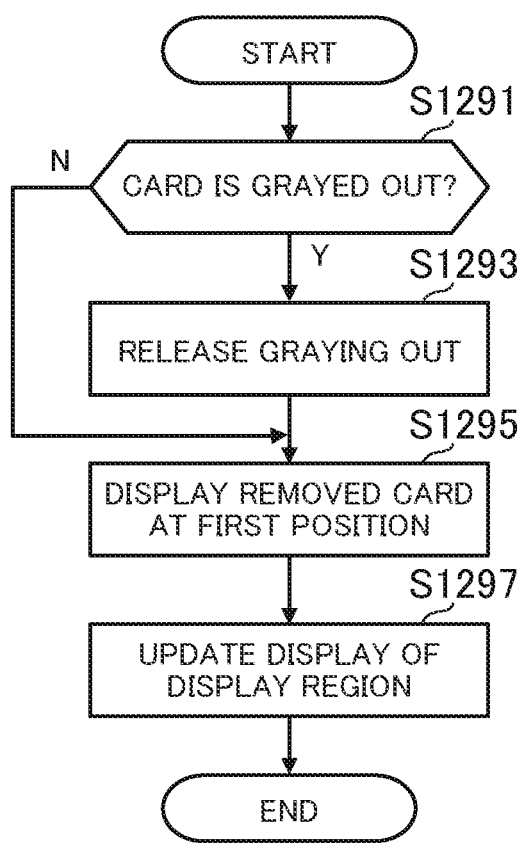
FIG. 24 is a flowchart for illustrating an example of display update processing for a case in which a card has been removed from the deck.

FIG. 24 is a flowchart for illustrating an example of display update processing for the case in which a card has been removed from the deck. As illustrated in FIG. 24, the control unit 11 determines whether or not the card removed from the deck is grayed out in the display region A412 (Step S1291). In Step S1291, the control unit 11 refers to the display information in the deck edit data DT1, and determines whether or not the card removed from the deck is grayed out.

When it is determined that the card is grayed out (Step S1291: Y), the control unit 11 releases the graying out of the card (Step S1293), and advances the processing to Step S1295 described later. In Step S1293, the control unit 11 updates the deck edit data DT1 such that that the graying out of the cards in the display regions A412 and A421 is released.

Meanwhile, when it is determined that the card is not grayed out (Step S1291: N), the processing of Step S1293 is not executed, and the control unit 11 displays the card removed from the deck at the first position of the display region A412 (Step S1295). In Step S1295, the control unit 11 updates the deck edit data DT1 such that the order of the card removed from the deck is first and the order of each of the other cards is moved back one place.

The control unit 11 updates the display of the display region A40 (Step S1297), and advances the processing to Step S105. In Step S1297, the control unit 11 displays the card added in Step S113 on the display region A404, and changes the number of the cards in the display region A401 and the display region A403.

In Step S105 of FIG. 20, when the card displayed in the display region A404 is right-clicked with the mouse (Step S105: right-click 2), the processing advances to FIG. 22, and the control unit 11 transmits to the server 30 a request for acquiring the detailed information on the card selected by the user (Step S131). The processing of Step S131 is the same as the processing of Step S107.

The processing of the subsequent Steps S309 and S133 is the same as the processing of Steps S307 and S123, respectively. In Step S133, when the detailed information on the right-clicked card is displayed in the display region A43, the processing advances to Step S127, the right-clicked card is removed from the deck, and in Step S129, display update processing of the removed card is executed.

When the button B45 is selected in Step S105 of FIG. 20 (Step S105: store button), the control unit 11 transmits to the server 30 a request to store the deck being edited (Step S135). In Step S135, the control unit 11 transmits the storage request together with the deck edit data DT1.

When the server 30 receives the storage request, the control unit 31 updates the contents of the deck database DB3 (Step S311), and this processing ends. In Step S311, the control unit 31 refers to the deck ID stored in the received deck edit data DT1, and updates the record in the deck database DB3 in which the user ID of the user who transmitted the storage request and the deck ID are associated based on the deck contents information in the deck edit data DT1.

In Step S105 of FIG. 20, when "other" operation is performed (Step S105: other operation), the control unit 11 executes processing in accordance with the operation (Step S137). In Step S137, for example, when the button B44 is selected, the control unit 11 returns to the deck contents image G3, and this processing ends. Moreover, for example, when the button for B46 is selected, the control unit 11 returns to the predetermined top image, and the processing ends.

According to the game system 1 described above, through displaying a name for identifying a card added to the deck in the display region A421, the card added to the deck can be easily understood, and the user is not required to look at each and every card in the display region A404 in order to find the card that the user added. As a result, the deck can be edited more easily, and the burden on the user can be reduced.

Moreover, through displaying the name of the card added to the deck in the display region A421, the card added to the deck can be easily understood simply by referring to the display region A421, and the user is not required to look at each and every card in the display region A404 displayed outside the specific region in order to find the card that the user added. As a result, the deck can be edited more easily, and the burden on the user can be reduced.

Moreover, when a card is selected, the name of the card is displayed in the display region A421, which allows the user to immediately grasp the card added to the deck or a card that is about to be added to the deck. Therefore, the burden on the user can be effectively reduced.

Moreover, through displaying the card in the display region A404 and the card in the display region A421 in the same screen, the deck can be edited while comparing the cards, which facilitates the editing work and enables the burden on the user to be effectively reduced. In addition, the time and effort required to switch screens each and every time the user checks the cards in the display region A404 and the cards in the display region A421 can be omitted.

Moreover, through displaying the card in the display region A404, the card in the display region A421, and the card in the display region A412 in the same screen, the deck can be edited while comparing those three cards, which enables the burden on the user to be effectively reduced. In addition, the time and effort required to switch screens each and every time the user checks those three cards can be omitted.

Moreover, through determining the display position of a card whose name is displayed in the display region A421 based on the order in which the cards are added to the deck, the cards added to the deck are displayed in time series, which enables, for example, the most recently added card to be easily identified, and the card added first to be easily identified. As a result, the burden on the user can be effectively reduced.

Moreover, when a card whose name is displayed in the display region A421 is selected, through adding the selected card to the deck, for example, an operation of additionally adding a card added to the deck becomes easier, and the burden on the user can be reduced more effectively.

Moreover, the display mode of a card whose name is displayed in the display region A421 is determined based on the related information associated with that card, and the related information and the display mode of the card can be correlated. As a result, the related information on the card can be grasped just by looking at the card in the display region A421.

Moreover, when a card whose name is not displayed in the display region A421 is added to the deck, the name of the card most recently added can be made conspicuous by displaying the name relating to the card at a predetermined position. In addition, when the display of a card whose name is displayed in the display region A421 changes, it takes time and effort to find the card again. However, when a card whose name is displayed in the display region A421 is added, the time and effort required to find that card can be reduced by not updating the display in the display region A421. Further, when there are a plurality of cards of the same type, the cards can be continuously added by a continuous operation on the display region A421, which enables editing to be performed more efficiently and the burden on the user can be effectively reduced.

Moreover, the display region A421 shows both the cards added to the deck and the cards removed from the deck, and both the added cards and the removed cards can be easily grasped. As a result, it becomes easier to edit the deck, and the burden on the user can be reduced.

Moreover, when a card whose name is displayed in the display region A421 is selected, through adding the selected card to the deck, for example, an operation of additionally adding a card added to the deck becomes easier, and the burden on the user can be reduced more effectively. In addition, when a card whose name is displayed in the display region A421 is selected, in place of removing the card from the deck, just by configuring such that the card is added, the operation can be prevented from becoming more complex. For example, it is possible to prevent an erroneous operation in which a card to be added is instead removed by mistake.

Moreover, through displaying information for identifying a card removed from the deck at a predetermined position, the most recently removed card can be highlighted.

5. Modification Examples

The present invention is not limited to at least one embodiment described above.

(1) For example, when a card displayed as the second card information is selected, the removal unit 103 may remove the selected card from the deck. That is, in at least one embodiment, even when the card displayed in the display region A421 is dragged and dropped or right-clicked, the card is not removed. However, the removal unit 103 may also be configured to remove a card displayed in the display region A421 when the card is dragged and dropped or right-clicked.

According to Modification Example (1), when a card whose name is displayed in the display region A421 is selected, through removing the selected card from the deck, for example, an operation of additionally removing a card removed from the deck becomes easier, and the burden on the user can be reduced more effectively.

(2) Moreover, for example, when a card not displayed as the second card information is removed from the deck, the second display control unit 104 may display the second card information for identifying the card at a predetermined position. When a card displayed as the second card information is removed from the deck, the second display control unit 104 is not required to update the display of the second card information.

That is, in at least one embodiment, when a card is removed, the removed card is displayed in the first position of the display region A421 regardless of whether or not the card is displayed in the display region A421. However, the display control unit 104 may also be configured to avoid changing the display position of a removed card when the removed card is displayed in the display region A421, and to display a removed card at the first position of the display region A42 when the removed card is not displayed in the display region A421.

According to Modification Example (2), when a card whose name is not displayed in the display region A421 is removed, the name of the card most recently removed can be made conspicuous by displaying the name of the card at a predetermined position. In addition, when the display position of a card whose name is displayed in the display region A421 changes, it takes time and effort to find the card again. However, when a card whose name is displayed in the display region A421 is removed, the time and effort required to find that card can be reduced by not updating the display in the display region A421. Further, when there are a plurality of cards of the same type, the cards can be continuously removed by a continuous operation on the display region A421, which enables editing to be performed more efficiently and the burden on the user can be effectively reduced.

(3) Further, for example, the processing described as being executed by the game terminal 10 in FIG. 20 to FIG. 24 may be executed by the server 30. Moreover, for example, the processing according to the present invention may be applied to a game other than the card game described above.

6. Supplementary Notes

From the description given above, the present invention is understood as follows, for example. In order to facilitate understanding of the present invention, the reference symbols provided in the drawings are enclosed in parentheses and assigned to components appropriately. However, the present invention is not to be limited to the aspects illustrated in the drawings as a result of this.

(1) A game system (1) according to at least one aspect of the present invention is configured to execute predetermined game processing based on an object group including a plurality of objects. The game system (1) includes: first display control means (101) for displaying, on display means (15), first object information on each of the plurality of objects included in the object group; addition means (102) for adding a selected object to the object group; and second display control means (104) for displaying, on the display means (15), second object information for identifying the object added to the object group.

(15) A game control device (10, 30) according to at least one aspect of the present invention is configured to execute predetermined game processing based on an object group including a plurality of objects. The game control device (10, 30) includes: first display control means (101) for displaying, on display means (15), first object information on each of the plurality of objects included in the object group; addition means (102) for adding a selected object to the object group; and second display control means (104) for displaying, on the display means (15), second object information for identifying the object added to the object group.

(16) A program according to at least one aspect of the present invention is a program for causing a computer to function as the game system (1) of any one of the items (1) to (14) or as the game control device (10, 30) of the item (15).

(17) An information storage medium according to at least one aspect of the present invention is a computer-readable information storage medium having stored thereon the program of the item (16).

(2) In at least one aspect of the present invention, the second display control means (104) is configured to display the second object information in a specific region of the display means (15), and the first display control means (101) is configured to display the first object information outside the specific region.

(3) In at least one aspect of the present invention, the second display control means (104) is configured to display, when the object is selected, the second object information for identifying the object on the display means (15).

(4) In at least one aspect of the present invention, the first object information and the second object information are displayed in the same screen.

(5) In at least one aspect of the present invention, the game system (1) further includes third display control means (105) for displaying third object information on one of an object possessed by a user and an object not included in the object group, and the first object information, the second object information, and the third object information are displayed in the same screen.

(6) In at least one aspect of the present invention, the second display control means (104) is configured to determine, based on an order in which the objects have been added to the object group, a display position of the object to be displayed as the second object information.

(7) In at least one aspect of the present invention, the addition means (102) is configured to add, when the object displayed as the second object information has been selected, the selected object to the object group.

(8) In at least one aspect of the present invention, the second display control means (104) is configured to determine, based on related information associated with the object displayed as the second object information, a display mode of the object displayed as the second object information.

(9) In at least one aspect of the present invention, the second display control means (104) is configured to: display, when an object not displayed as the second object information is added to the object group, the second object information for identifying the object at a predetermined position; and avoid updating the display relating to the second object information when an object displayed as the second object information is added to the object group.

(10) In at least one aspect of the present invention, the game system (1) further includes removal means (103) for removing the selected object from the object group, and the second object information includes information for identifying an object added to the object group and information for identifying an object removed from the object group.

(11) In at least one aspect of the present invention, the addition means (102) is configured to add, when an object displayed as the second object information is selected, the selected object to the object group, and the removal means (103) is configured to avoid removing, even when an object displayed as the second object information is selected, the selected object from the object group.

(12) In at least one aspect of the present invention, the second display control means (104) is configured to display, when an object has been removed from the object group, the second object information for identifying the removed object at a predetermined position.

(13) In at least one aspect of the present invention, the removal means (103) is configured to remove, when an object displayed as the second object information is selected, the selected object from the object group.

(14) In at least one aspect of the present invention, the second display control means (104) is configured to: display, when an object not displayed as the second object information has been removed from the object group, the second object information for identifying the removed object at a predetermined position; and avoid updating the display of the second object information when an object displayed as the second object information has been removed from the object group.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game system, comprising at least one processor configured to execute predetermined game processing based on an object group including a plurality of objects, the at least one processor being configured to:
    display first object information on each of the plurality of objects included in the object group in a first region, on a display;
    add a selected object to the object group; and
    display second object information for identifying the object added to the object group in a second region, on the display;
    display an image of a selected object in a third region, on the display; and
    display detailed object information on the selected object in a fourth region, on the display.

2. The game system according to claim 1, wherein the at least one processor is configured to:
    display the first region outside of the second region.

3. The game system according to claim 1, wherein the at least one processor is configured to display, when the object is selected, the second object information for identifying the object on the display.

4. The game system according to claim 1, wherein the first region and the second region are displayed in the same screen.

5. The game system according to claim 1, wherein the at least one processor is configured to:
    display third object information on one of an object possessed by a user and an object not included in the object group; and
    display the first object information, the second object information, and the third object information in the same screen.

6. The game system according to claim 1, wherein the at least one processor is configured to determine, based on an order in which the objects have been added to the object group, a display position of the object to be displayed as the second object information.

7. The game system according to claim 1, wherein the at least one processor is configured to add, when the object displayed as the second object information has been selected, the selected object to the object group.

8. The game system according to claim 1, wherein the at least one processor is configured to determine, based on related information associated with the object displayed as the second object information, a display mode of the object displayed as the second object information.

9. The game system according to claim 1, wherein the at least one processor is configured to:
    display, when an object not displayed as the second object information is added to the object group, the second object information for identifying the object at a predetermined position; and
    avoid updating the display relating to the second object information when an object displayed as the second object information is added to the object group.

10. The game system according to claim 1,
    wherein the at least one processor is configured to remove the selected object from the object group, and
    wherein the second object information includes information for identifying an object added to the object group and information for identifying an object removed from the object group.

11. The game system according to claim 10, wherein the at least one processor is configured to:
    add, when an object displayed as the second object information is selected, the selected object to the object group; and
    avoid removing, even when an object displayed as the second object information is selected, the selected object from the object group.

12. The game system according to claim 10, wherein the at least one processor is configured to display, when an object has been removed from the object group, the second object information for identifying the removed object at a predetermined position.

13. The game system according to claim 10, wherein the at least one processor is configured to remove, when an object displayed as the second object information is selected, the selected object from the object group.

14. The game system according to claim 10, wherein the at least one processor is configured to:
    display, when an object not displayed as the second object information has been removed from the object group, the second object information for identifying the removed object at a predetermined position; and
    avoid updating the display of the second object information when an object displayed as the second object information has been removed from the object group.

15. A game control device, comprising at least one processor configured to execute predetermined game processing based on an object group including a plurality of objects, the at least one processor being configured to:
   display first object information on each of the plurality of objects included in the object group in a first region, on a display;
   add a selected object to the object group; and
   display second object information for identifying the object added to the object group in a second region, on the display;
   display an image of a selected object in a third region, on the display; and
   display detailed object information on the selected object in a fourth region, on the display.

16. A non-transitory information storage medium having stored thereon a program, which is configured to execute predetermined game processing based on an object group including a plurality of objects, the program causing the computer to:
   display first object information on each of the plurality of objects included in the object group in a first region, on a display;
   add a selected object to the object group; and
   display second object information for identifying the object added to the object group in a second region, on the display;
   display an image of a selected object in a third region, on the display; and
   display detailed object information on the selected object in a fourth region, on the display.

17. The game system according to claim 1,
   wherein the object group is a deck that is used in a card game, and
   wherein the at least one processor is configured to display a deck edit image that includes the first object information and the second object information in a fifth region.

18. The game system according to claim 1,
   wherein the at least one processor is configured to remove the object from the object group, and
   wherein the second object information identifies the object that is added to the object group and removed from the object group.

19. The game system according to claim 1, wherein the object group includes same objects.

20. The game system according to claim 19, wherein the at least one processor is configured to limit the number of same objects in the object group.

* * * * *